United States Patent [19]
Packer

[11] Patent Number: 6,046,980
[45] Date of Patent: Apr. 4, 2000

[54] SYSTEM FOR MANAGING FLOW BANDWIDTH UTILIZATION AT NETWORK, TRANSPORT AND APPLICATION LAYERS IN STORE AND FORWARD NETWORK

[75] Inventor: Robert L. Packer, Los Gatos, Calif.

[73] Assignee: Packeteer, Inc., Cupertino, Calif.

[21] Appl. No.: 08/977,642

[22] Filed: Nov. 24, 1997

Related U.S. Application Data

[60] Provisional application No. 60/032,485, Dec. 9, 1996.

[51] Int. Cl.[7] .................................................. G01R 31/08
[52] U.S. Cl. .......................................... 370/230; 370/229
[58] Field of Search .................................... 370/229, 230, 370/231, 232, 235, 465, 466, 468

[56] References Cited

U.S. PATENT DOCUMENTS

| | | |
|---|---|---|
| 4,870,641 | 9/1989 | Pattavina . |
| 5,315,586 | 5/1994 | Charvillat . |
| 5,347,511 | 9/1994 | Gun .......................................... 370/54 |
| 5,442,630 | 8/1995 | Gagliardi et al. .......................... 370/85 |
| 5,506,834 | 4/1996 | Sekihata et al. . |
| 5,530,852 | 6/1996 | Meske, Jr. et al. ...................... 395/600 |
| 5,583,857 | 12/1996 | Soumiya ................................. 370/233 |
| 5,694,548 | 12/1997 | Baugher ................................. 370/231 |
| 5,701,465 | 12/1997 | Baugher ................................. 370/468 |
| 5,732,219 | 3/1998 | Blumer et al. . |
| 5,748,629 | 5/1998 | Caldara .................................. 370/468 |
| 5,764,645 | 6/1998 | Bernet .................................... 370/466 |

*Primary Examiner*—Ajit Patel
*Assistant Examiner*—Ricardo M. Pizarro
*Attorney, Agent, or Firm*—Townsend and Townsend and Crew LLP; Kenneth R. Allen

[57] ABSTRACT

In a packet communication environment, a method is provided for classifying packet network flows for use in determining a policy, or rule of assignment of a service level, and enforcing that policy by direct rate control. The method comprises applying individual instances of traffic objects, i.e., packet network flows to a classification model based on selectable information obtained from a plurality of layers of a multi-layered communication protocol, then mapping the flow to the defined traffic classes, which are arbitrarily assignable by an offline manager which creates the classification. It is useful to note that the classification need not be a complete enumeration of the possible traffic.

17 Claims, 20 Drawing Sheets

(STEP 506 OF FIG. 5A)

(STEPS 582 AND 584 OF FIG. 5G)

SYSTEM FOR MANAGING FLOW BANDWIDTH UTILIZATION AT NETWORK, TRANSPORT AND APPLICATION LAYERS IN STORE AND FORWARD NETWORK

CROSS-REFERENCE TO RELATED APPLICATIONS

This application claims the benefit of U.S. Provisional Ser. No. 60/032,485 filed Dec. 9, 1996.

The following related commonly-owned copending application is being filed concurrently and is hereby incorporated by reference in its entirety for all purposes: U.S. patent application Ser. No. 08/977,376, in the name of Robert L. Packer, entitled "Method for Managing Flow Bandwidth Utilization at Network, Transport and Application Layers,".

This application claims priority from the following U.S. Provisional Application, the disclosure of which, including all appendices and all attached documents, is incorporated by reference in its entirety for all purposes:

U.S. Provisional Patent Application Ser. No. 60/032,485, Robert L. Packer, entitled, "Method for Managing Flow Bandwidth Utilization at Network, Transport and Application Layers in Store and Forward Network", filed Dec. 9, 1996.

Further, this application makes reference to the following commonly owned U.S. patent Application, which is incorporated herein in its entirety for all purposes:

Copending U.S. patent application Ser. No. 08/762,828, in the name of Robert L. Packer, entitled "Method for Rapid Data Rate Detection in a Packet Communication Environment Without Data Rate Supervision," relates to a technique for automatically determining the data rate of a TCP connection.

Further, this application makes reference to the following U.S. patent Application:

Copending U.S. patent application Ser. No. 08/742,994, in the name of Robert L. Packer, entitled "Method for Explicit Data Rate Control in a Packet Communication Environment Without a Data Rate Supervision," relates to a technique for automatically scheduling TCP packets for transmission.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PAPER APPENDIX

The following paper appendices are included herewith and incorporated by reference in their entirety for all purposes:

Appendix A: Source code listing of bandwidth allocation processing an embodiment of the invention comprising ten (10) sheets;

Appendix B: Source code listing of URL classification processing an embodiment of the invention comprising twenty-four (24) sheets;

Appendix C: Source code listing of classification processing an embodiment of the invention comprising nine (9) sheets; and Appendix D: Source code listing of speed scaling processing an embodiment of the invention comprising ten (10) sheets.

BACKGROUND OF THE INVENTION

This invention relates to digital packet telecommunications, and particularly to management of network bandwidth based on information ascertainable from multiple layers of OSI network model. It is particularly useful in conjunction with data flow rate detection and control of a digitally-switched packet telecommunications environment normally not subject to data flow rate control.

The ubiquitous TCP/IP protocol suite, which implements the world-wide data communication network environment called the Internet and is also used in private networks (Intranets), intentionally omits explicit supervisory function over the rate of data transport over the various media which comprise the network. While there are certain perceived advantages, this characteristic has the consequence of juxtaposing very high-speed packet flows and very low-speed packet flows in potential conflict for network resources, which results in inefficiencies. Certain pathological loading conditions can result in instability, overloading and data transfer stoppage. Therefore, it is desirable to provide some mechanism to optimize efficiency of data transfer while minimizing the risk of data loss. Early indication of the rate of data flow which can or must be supported is very useful. In fact, data flow rate capacity information is a key factor for use in resource allocation decisions.

Internet/Intranet technology is based largely on the TCP/IP protocol suite, where IP, or Internet Protocol, is the network layer protocol and TCP, or Transmission Control Protocol, is the transport layer protocol. At the network level, IP provides a "datagram" delivery service. By contrast, TCP builds a transport level service over the datagram service to provide guaranteed, sequential delivery of a byte stream between two IP hosts.

TCP flow control mechanisms operate exclusively at the end stations to limit the rate at which TCP endpoints emit data. However, TCP lacks explicit data rate control. In fact, there is heretofore no concept of coordination of data rates among multiple flows. The basic TCP flow control mechanism is a sliding window, superimposed on a range of bytes beyond the last explicitly-acknowledged byte. Its sliding operation limits the amount of unacknowledged transmissible data that a TCP endpoint can emit.

Another flow control mechanism is a congestion window, which is a refinement of the sliding window scheme, which employs conservative expansion to fully utilize all of the allowable window. A component of this mechanism is sometimes referred to as "slow start".

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is retransmitted.

Data rate flow control mechanisms which are operative end-to-end without explicit data rate control draw a strong inference of congestion from packet loss (inferred, typically, by RTO). TCP end systems, for example, will 'back-off', i.e., inhibit transmission in increasing multiples of the base RTT average as a reaction to consecutive packet loss.

Bandwidth Management in TCP/IP Networks

Conventional bandwidth management in TCP/IP networks is accomplished by a combination of TCP end systems and routers which queue packets and discard packets when certain congestion thresholds are exceeded. The discarded, and therefore unacknowledged, packet serves as a feedback mechanism to the TCP transmitter. (TCP end systems are clients or servers running the TCP transport protocol, typically as part of their operating system.)

The term "bandwidth management" is often used to refer to link level bandwidth management, e.g. multiple line support for Point to Point Protocol (PPP). Link level bandwidth management is essentially the process of keeping track of all traffic and deciding whether an additional dial line or ISDN channel should be opened or an extraneous one closed. The field of this invention is concerned with network level bandwidth management, i.e. policies to assign available bandwidth from a single logical link to network flows.

Routers support various queuing options. These options are generally intended to promote fairness and to provide a rough ability to partition and prioritize separate classes of traffic. Configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users.

In a copending U.S. patent application Ser. No. 08/742,994, in the name of Robert L. Packer, entitled "Method for Explicit Data Rate Control in a Packet Communication Environment Without Data Rate Supervision," a technique for automatically scheduling TCP packets for transmission is disclosed. Furthermore, in a copending U.S. patent application Ser. No. 08/762,828, in the name of Robert L. Packer, entitled "Method for Rapid Data Rate Detection in a Packet Communication Environment Without Data Rate Supervision," a technique for automatically determining the data rate of a TCP connection is disclosed. While these patent applications teach methods for solving problems associated with scheduling transmissions and for automatically determining a data flow rate on a TCP connection, respectively, there is no teaching in the prior art of methods for explicitly managing TCP packet traffic based upon information about the flow's characteristics at multiple OSI protocol layers.

Bandwidth management is heretofore not known to employ information contained in the packets corresponding to higher OSI protocol layers, even though such information may be extremely useful in making bandwidth allocation and management decisions.

SUMMARY OF THE INVENTION

According to the invention, in a packet communication environment, a method is provided for classifying packet network flows for use in determining a policy, or rule of assignment of a service level, and enforcing that policy by direct rate control. The method comprises applying individual instances of traffic objects, i.e., packet network flows to a classification model based on selectable information obtained from a plurality of layers of a multi-layered communication protocol, then mapping the flow to the defined traffic classes, which are arbitrarily assignable by an offline manager which creates the classification. It is useful to note that the classification need not be a complete enumeration of the possible traffic.

In one aspect of the invention, bandwidth may be divided into arbitrary units, partitions, facilitating isolation and allocation. A partition is allocated for a class or set of traffic classes, carving the bandwidth of the associated link into multiple, independent pieces.

In another aspect of the invention, available bandwidth may be allocated among flows according to a policy, which may include any combination of guaranteed information rate, excess information rate, the later allocated according to a priority.

In another aspect of the invention, bandwidth resource needs of multiple heterogeneous requesting flows are reconciled with available bandwidth resources in accordance with policy of each flow based upon the flow's class. Flows requiring reserved service with guaranteed information rates, excess information rates or unreserved service are reconciled with the available bandwidth resources continuously and automatically.

In another aspect of the invention, providing an admissions policy which is invoked whenever a request for a bandwidth cannot be met consistently with other users of bandwidth.

An advantage of network management techniques according to the present invention is that network managers need only define traffic classes which are of interest.

A further advantage of the present invention is that traffic classes may include information such as a URI for web traffic.

A yet further advantage of the present invention is that service levels may be defined in terms of explicit rates and may be scaled to a remote client or server's network access rate. Different service levels may be specified for high speed and low speed users.

A yet further advantage of the present invention is that service levels may be defined in terms of a guaranteed minimum service level.

The invention will be better understood upon reference to the following detailed description in connection with the accompanying drawings.

DETAILED DESCRIPTION OF SPECIFIC EMBODIMENTS

Figure 1A:
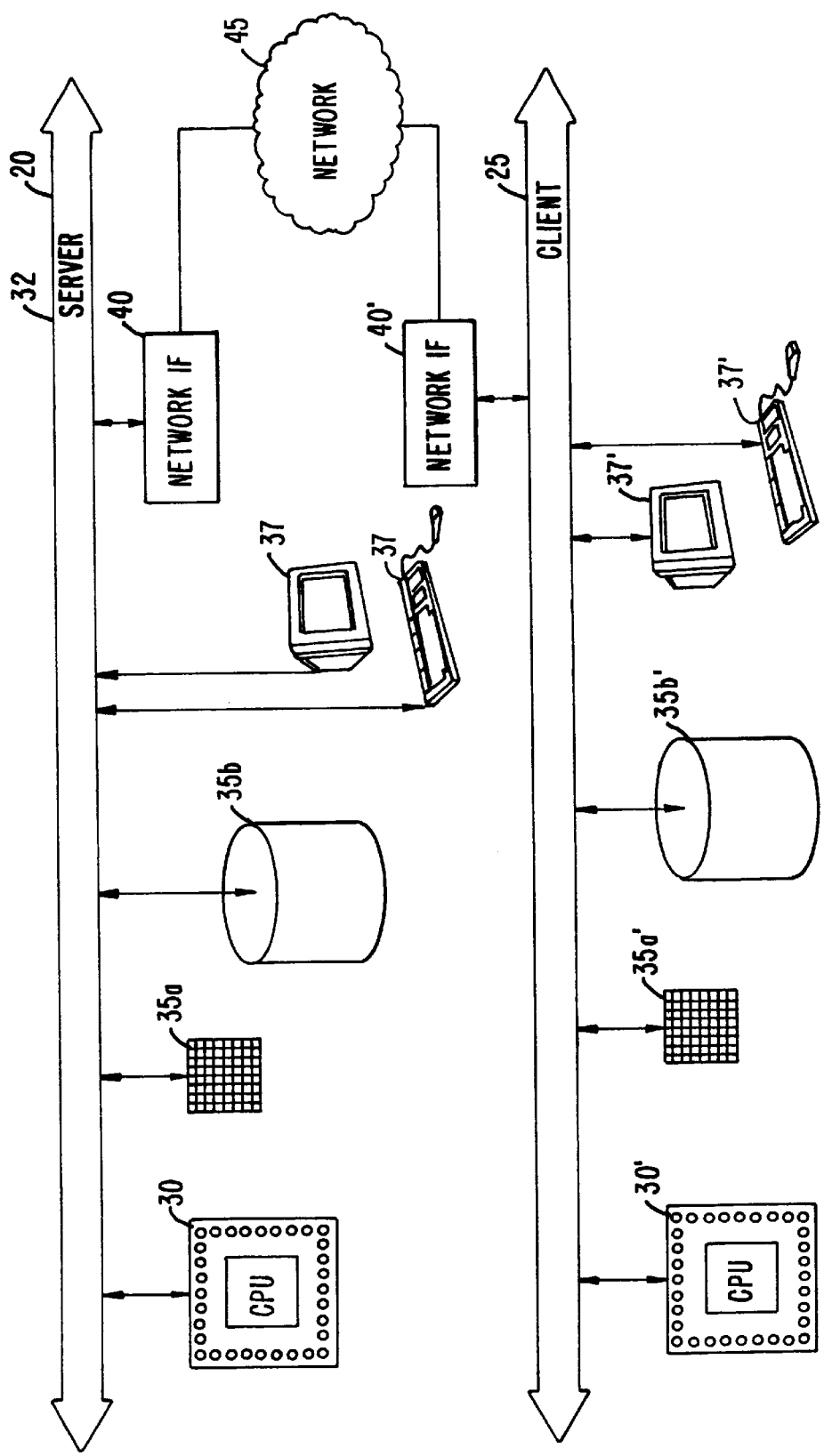
FIG. 1A depicts a representative client server relationship in accordance with a particular embodiment of the invention.

A preferable embodiment of a flow bandwidth management system according to the invention has been reduced to practice and will be made available under the trade name "PacketShaper™."

1.0 Introduction

The present invention provides techniques to manage network bandwidth such as on a network access link between a local area network and a wide area network. Systems according to the present invention enable network managers to: define traffic classes; create policies which define service levels for traffic classes; and isolate bandwidth resources associated with certain traffic classes. Inbound as well as outbound traffic may be managed. Table 1 provides a definitional list of terminology used herein.

TABLE 1

LIST OF DEFINITIONAL TERMS

| | |
|---|---|
| ADMISSIONS CONTROL | A policy invoked whenever a system according to the invention detects that a guaranteed information rate cannot be maintained. An admissions control policy is analogous to a busy signal in the telephone world. |
| CLASS SEARCH ORDER | A search method based upon traversal of a N-ary tree data structure containing classes. |
| COMMITTED INFORMATION RATE (CIR) | A rate of data flow allocated to reserved service traffic for rate based bandwidth allocation for a committed bandwidth. Also called a guaranteed information rate (GIR). |
| EXCEPTION | A class of traffic provided by the user which supersedes an automatically determined classification order. |
| EXCESS INFORMATION RATE (EIR) | A rate of data flow allocated to reserved service traffic for rate based bandwidth allocation for uncommitted bandwidth resources. |
| FLOW | A flow is a single instance of a traffic class. For example, all packets in a TCP connection belong to the same flow. As do all packets in a UDP session. |
| GUARANTEED INFORMATION RATE (GIR) | A rate of data flow allocated to reserved service traffic for rate based bandwidth allocation for a committed bandwidth. Also called a committed information rate (CIR). |
| HARD ISOLATION | Hard isolation results from the creation of an entirely separate logical channel for a designated set of classes. |
| INSIDE | On the system side of an access link. Outside clients and servers are on the other side of the access link. |
| ISOLATION | Isolation is the degree that bandwidth resources are allocable to traffic classes. |
| OUTSIDE | On the opposite side of an access link as viewed from the perspective of the system on which the software resides. |
| PARTITION | Partition is an arbitrary unit of network resources. |
| POLICY | A rule for the assignment of a service level to a flow. |
| POLICY INHERITANCE | A method for assigning policies to flows for which no policy exists in a hierarchical arrangement of policies. For example, if a flow is determined to be comprised of FTP packets for Host A, and no corresponding policy exists, a policy associated with a parent node, such as an FTP policy, may be located and used. See also POLICY SEARCH ORDER. |

TABLE 1-continued

LIST OF DEFINITIONAL TERMS

| | |
|---|---|
| POLICY BASED SCALING | An adjustment of a requested data rate for a particular flow based upon the policy associated with the flow and information about the flow's potential rate. |
| RESERVED SERVICE | Reserved service is a service level intended for traffic which "bursts" or sends chunks of data. Reserved service is defined in terms of a scaled rate. |
| SCALED RATE | Assignment of a data rate based upon detected speed. |
| SERVICE LEVEL | A service paradigm having a combination of characteristics defined by a network manager to handle a particular class of traffic. Service levels may be designated as either reserved or unreserved. |
| SOFT ISOLATION | Restricting GIR allocated for traffic classes in a partition. |
| TARGET RATE | A target rate is a combination of a guaranteed rate and an excess rate. Target rate is a policy-based paradigm. Excess rate is allocated by systems according to the invention from bandwidth that is not consumed by reserved service. Policies will demand excess rate at a given priority and systems according to the invention satisfy this demand by a priority level. |
| TRAFFIC CLASS | All traffic between a client and a server endpoints. A single instance of a traffic class is called a flow. Traffic classes have properties or class attributes such as, directionality, which is the property of traffic to be flowing inbound or outbound. |
| UNRESERVED SERVICE | Unreserved service is a service level defined in terms of priority in which no reservation of bandwidth is made. |

1.1 Hardware Overview

The method for flow bandwidth management in a packet oriented telecommunications network environment of the present invention is implemented in the C programming language and is operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of a memory subsystem 35*a* and a file storage subsystem 35*b* holding computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface"

block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC server. Corresponding elements and subsystems in the client computer are shown with corresponding, but primed, reference numerals.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports.

Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to modem or network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
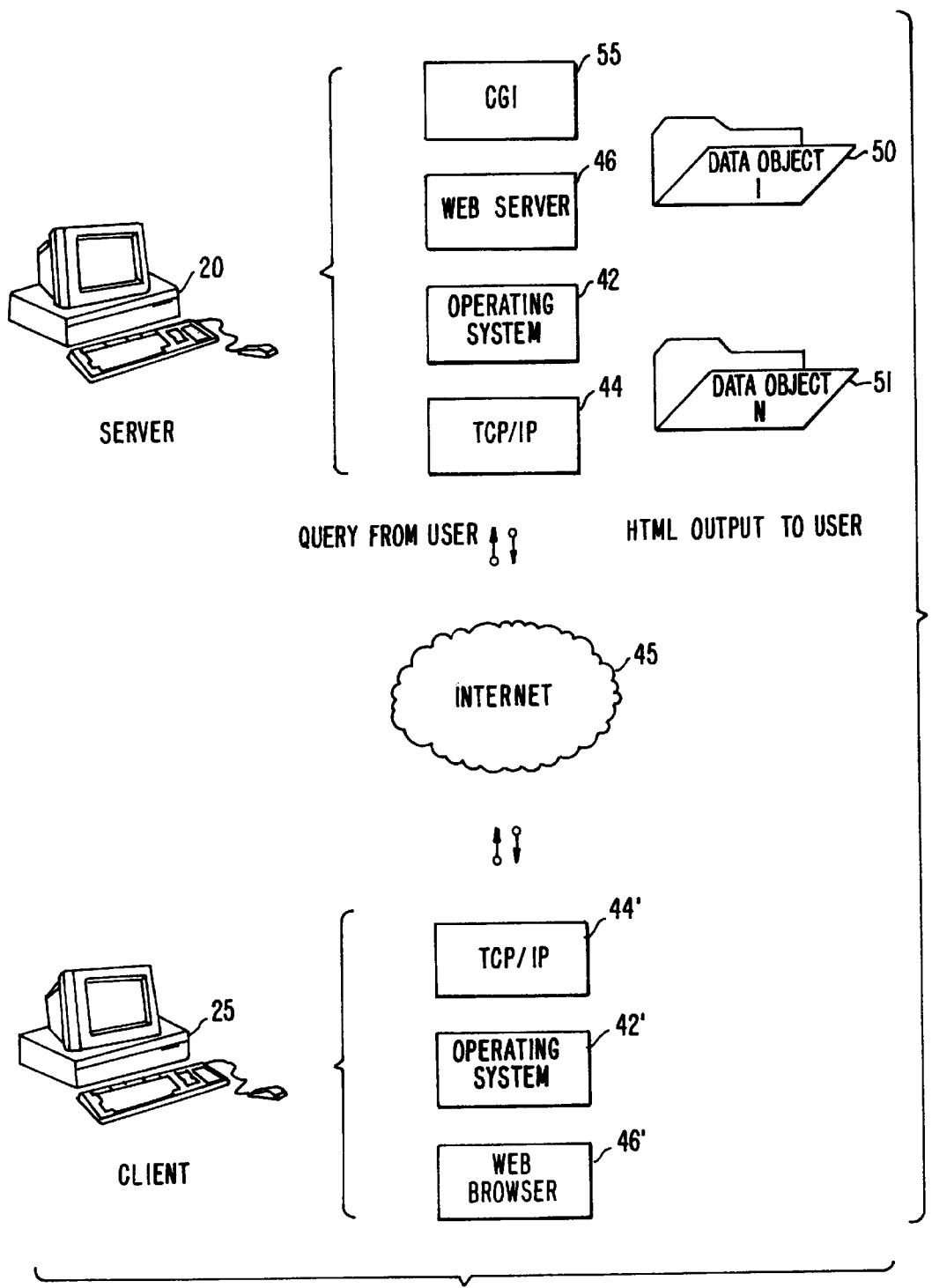
FIG. 1B depicts a functional perspective of the representative client server relationship in accordance with a particular embodiment of the invention.

FIG. 1B is a functional diagram of a computer system such as that of FIG. 1A. FIG. 1B depicts a server 20, and a representative client 25 of a plurality of clients which may interact with the server 20 via the Internet 45 or any other communications method. Blocks to the right of the server are indicative of the processing steps and functions which occur in the server's program and data storage indicated by blocks 35a and 35b in FIG. 1A. A TCP/IP "stack" 44 works in conjunction with Operating System 42 to communicate with processes over a network or serial connection attaching Server to Internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via Internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for data objects 50 and 51. The user of the client may interact via the web browser 46' to make such queries of the server 20 via Internet 45 and to view responses from the server 20 via Internet 45 on the web browser 46'.

1.2 Network Overview

Figure 1C:
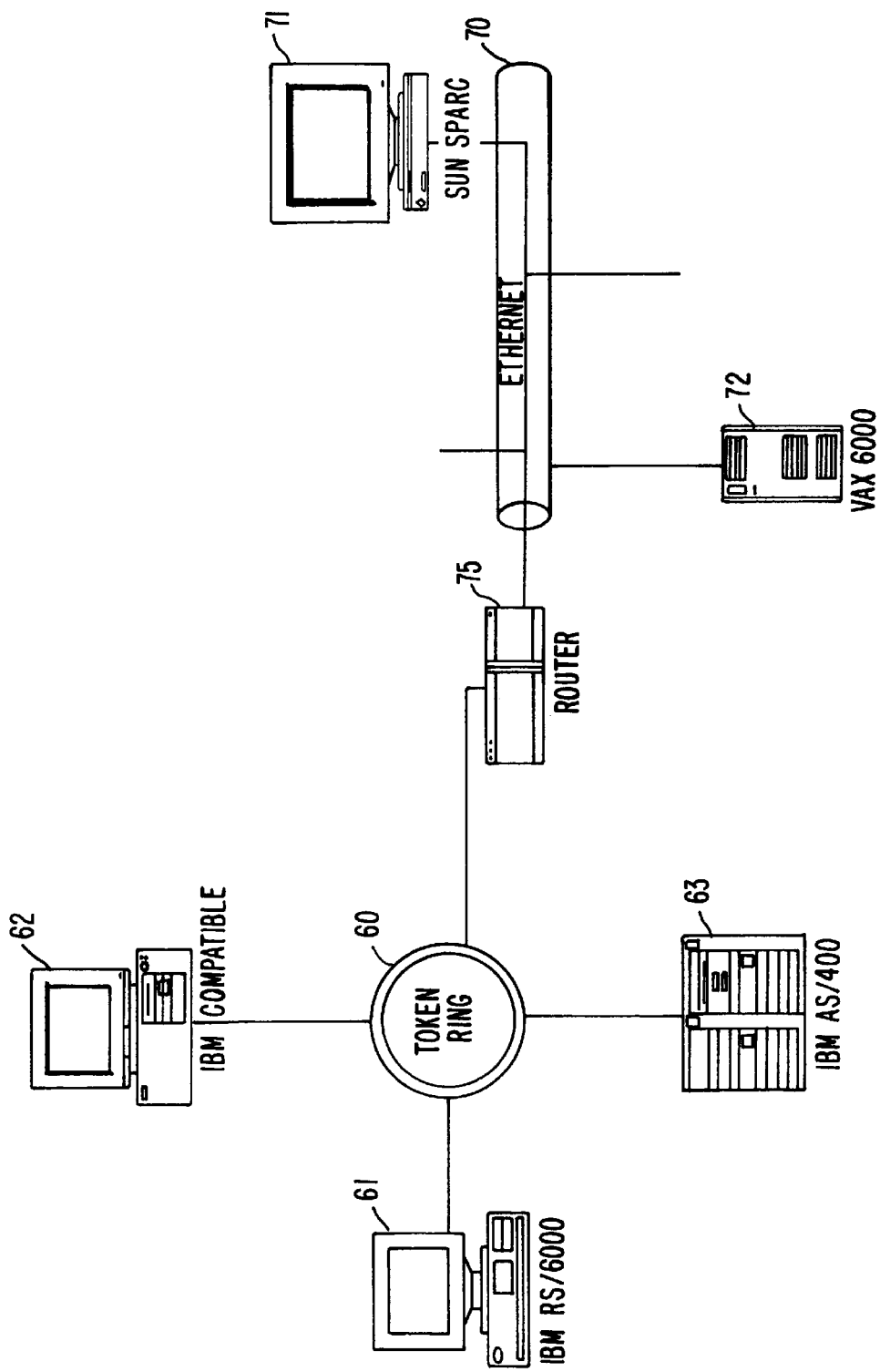
FIG. 1C depicts a representative internetworking environment in accordance with a particular embodiment of the invention.

FIG. 1C is illustrative of the internetworking of a plurality of clients such as client 25 of FIGS. 1A and 1B and a plurality of servers such as server 20 of FIGS. 1A and 1B as described herein above. In FIG. 1C, network 70 is an example of a Token Ring or frame oriented network. Network 70 links host 71, such as an IBM RS6000 RISC workstation, which may be running the AIX operating system, to host 72, which is a personal computer, which may be running Windows 95, IBM OS/2 or a DOS operating system, and host 73, which may be an IBM AS/400 computer, which may be running the OS/400 operating system. Network 70 is internetworked to network 60 via a system gateway which is depicted here as router 75, but which may also be a gateway having a firewall or a network bridge. Network 60 is an example of an Ethernet network that interconnects host 61, which is a SPARC workstation, which may be running SUNOS operating system with host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP ARP and RIP, which are described herein below.

Figure 1D:
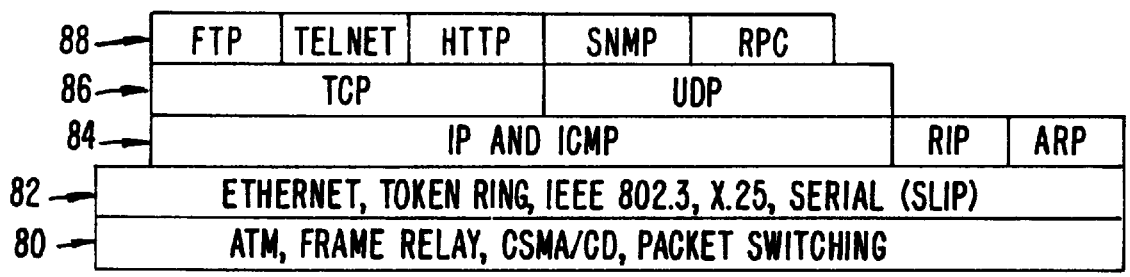
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet. User requests for data objects are made by means of an HTTP request, such as a GET request. A GET request as depicted below is comprised of 1) an HTTP protocol version, such as "http:/1.0"; followed by 2) the full path of the data object; followed by 3) the name of the data object. In the GET request shown below, a request is being made for the data object with a path name of "/pub/" and a name of "MyData.html":

$$\text{HTTP-Version GET /pub/MyData.html} \tag{1}$$

Processing of a GET request entails the establishing of an TCP/IP connection with the server named in the GET request and receipt from the server of the data object specified. After receiving and interpreting a request message, a server responds in the form of an HTTP RESPONSE message.

Response messages begin with a status line comprising a protocol version followed by a numeric Status Code and an associated textual Reason Phrase. These elements are separated by space characters. The format of a status line is depicted in line (2):

$$\text{Status-Line=HTTP-Version Status-Code Reason-Phrase} \tag{2}$$

The status line always begins with a protocol version and status code, e.g., "HTTP/1.0 200". The status code element is a three digit integer result code of the attempt to understand and satisfy a prior request message. The reason phrase is intended to give a short textual description of the status code.

The first digit of the status code defines the class of response. There are five categories for the first digit. 1XX is an information response. It is not currently used. 2XX is a successful response, indicating that the action was successfully received, understood and accepted. 3XX is a redirection response, indicating that further action must be taken in order to complete the request. 4XX is a client error response. This indicates a bad syntax in the request. Finally, 5XX is a server error. This indicates that the server failed to fulfill an apparently valid request.

Particular formats of HTTP messages are described in, Crocker, D., "Standard for the Format of ARPA Internet Text Messages", STD 11, RFC 822, UDEL, August 1982, which is incorporated by reference herein for all purposes.

1.3 TCP Data Link Rate and Latency Period Determination

Techniques for determining data rates are more fully set forth in co-owned U.S. patent application Ser. No. 08/762,828, entitled "Method for Rapid Data Rate Detection in a Packet Communication Environment Without Data Rate Supervision", which is incorporated herein by reference for all purposes.

Figure 1E:
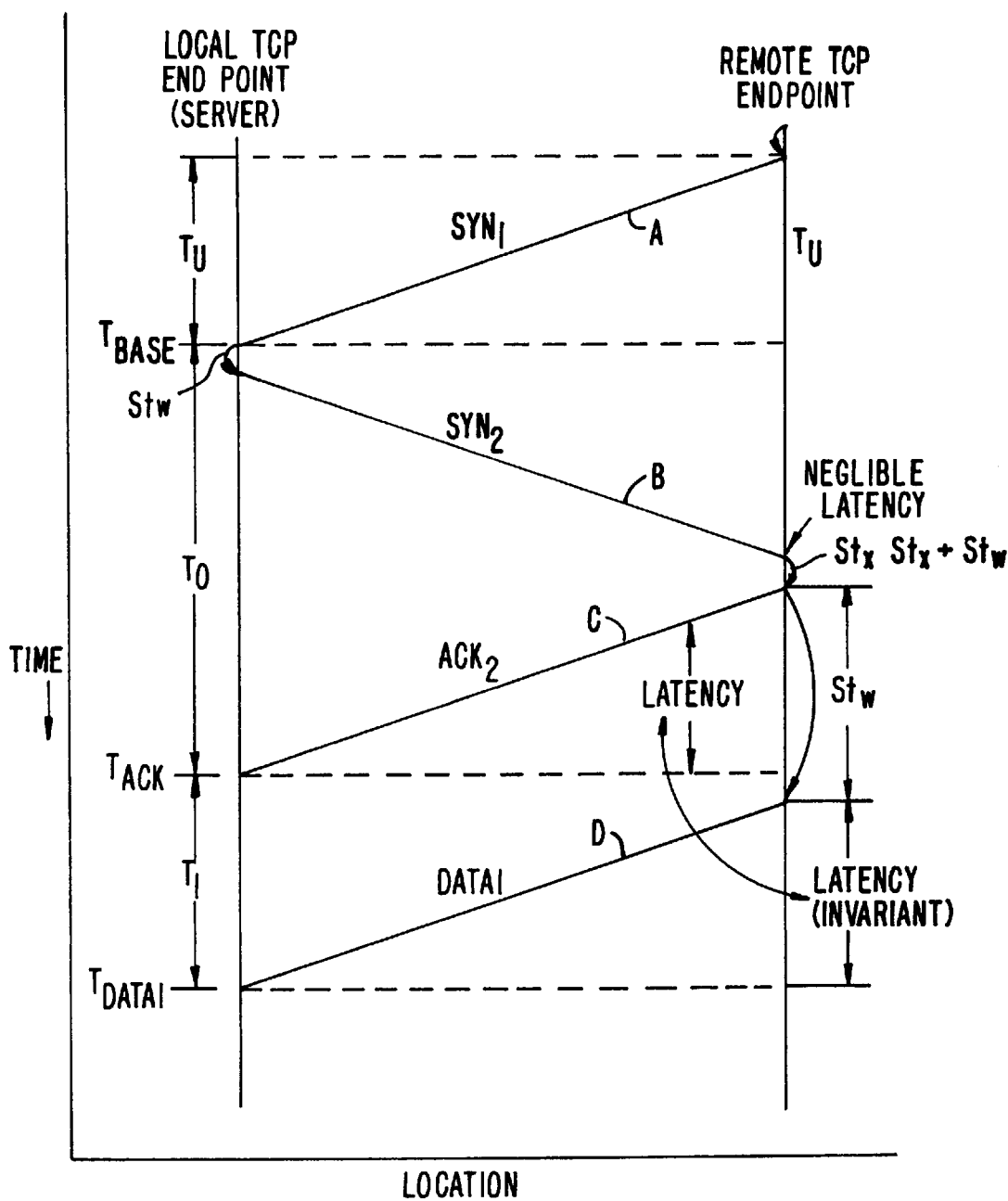
FIG. 1E depicts a two dimensional representation of timing relationships in the exchange of packets between hosts using the TCP protocol.

FIG. 1E depicts a two-dimensional timing diagram illustrative of one particular method for determining a data link rate and latency period from an exchange of packets between TCP endpoints. According to this method, the initial data packets are examined as they establish a connection. Parameters are developed from which round trip time (RTT) and maximum data rate can be determined. The serialization speed (SS) or data flow rate capacity of a link is given by the relation:

$$SS=m/T_1 \tag{3}$$

where:

$m$=number of bytes in the first data packet (Data1)

$T_1$=The arrival time of the first data packet less the time of arrival of the ACK packet ($T_{data1}-T_{ACK}$)

FIG. 1E shows a two dimensional timing diagram of the connection protocol of a remote HTTP request between a local TCP endpoint (server) and a remote TCP endpoint (client). The remote endpoint issues a request for connection in the form of a SYN packet in step A. The SYN packet takes a finite but unknown transit time to arrive at the local TCP endpoint. The local TCP endpoint responds by sending its own SYN packet in step B. This SYN packet is of a known byte length and is issued at a known time, which becomes the reference time, "tbase." After a brief latency, the remote TCP endpoint issues a standard ACK packet, whose length is likewise known, in step C, and then also issues the first data packet data1 in step D.

Time $T_1$ is computed immediately at the time of arrival of data1 by examining the difference in arrival time of the received ACK packet and the data1 packet. The value of m is extracted by examining the entire first packet to determine its length or by examining the packet length field, if any, in the header information of the packet. A first estimate of serialization speed SS is given by Equation (3). Serialization speed can be estimated immediately upon interchange of the first packets and used to make important strategic decisions about the nature and speed of the connection about to be established.

An alternative method for determining a data link rate and latency period from an exchange of packets between TCP endpoints develops parameters from which round trip time (RTT) and maximum data rate can be determined. Values are obtained for serialization of n, the size (i.e., data length) of the SYN packet in response, plus the size (i.e., data length) of the ACK packet. Serialization time is determined according to equation (4) by dividing the value n by the transit time $T_0$, or $$SS(\text{max possible})=n/T_0 \tag{4}$$

where n=number of bytes in the SYN packet plus the number of bytes in the ACK packet and $T_0$=the arrival time of the ACK packet less the tbase value.

The round trip time minus the serialization time is the round trip latency $T_d$.

2.0 Traffic Class

A traffic class is broadly defined as traffic between one or more clients and one or more servers. A single instance of a traffic class is called a flow. Traffic classes have the property, or class attribute, of being directional, i.e. all traffic flowing inbound will belong to different traffic classes and be managed separately from traffic flowing outbound. The directional property enables asymmetric classification and control of traffic, i.e., inbound and outbound flows belong to different classes which may be managed independent of one another.

Traffic classes may be defined at any level of the TCP/IP protocol. For example, at the IP level, traffic may be defined as only those flows between a set of inside and outside IP addresses or domain names. An example of such a low level traffic class definition would be all traffic between my network and other corporate offices throughout the Internet. At the application level, traffic classes may be defined for specific URIs within a web server. Traffic classes may be defined having "Web aware" class attributes. For example, a traffic class could be created such as all URIs matching "*.html" for all servers, or all URIs matching "*.gif" for server X, or for access to server Y with URI "/sales/*" from client Z, wherein '*' is a wildcard character, i.e., a character which matches all other character combinations. Traffic class attributes left unspecified will simply match any value for that attribute. For example, a traffic class that accesses data objects within a certain directory path of a web server is specified by a URI of the directory path to be managed, e.g. "/sales/*".

2.1 Classifying Traffic

The present invention provides a method for classifying traffic according to a definable set of classification attributes selectable by the manager, including selecting a subset of traffic of interest to be classified. The invention provides the ability to classify and search traffic based upon multiple orthogonal classification attributes. Traffic class membership may be hierarchical. Thus, a flow may be classified by a series of steps through a traffic class tree, with the last step (i.e., at the leaves on the classification tree) mapping the flow to a policy. The policy is a rule of assignment for flows. For example, the first step in classification may be to classify a flow as web traffic, the next may further classify this flow as belonging to server X, and the final classification may be a policy for URI "*.avi".

A classification tree is a data structure representing the hierarchical aspect of traffic class relationships. Each node of the classification tree represents a class, and has a traffic specification, i.e., a set of attributes or characteristics describing the traffic, and a mask associated with it. Leaf nodes of the classification tree contain policies. According to a particular embodiment, the classification process checks at each level if the flow being classified matches the attributes of a given traffic class. If it does, processing continues down to the links associated with that node in the tree. If it does not, the class at the level that matches determines the policy for the flow being classified. If no policy specific match is found, the flow is assigned the default policy.

In a preferable embodiment, the classification tree is an N-ary tree with its nodes ordered by specificity. For example, in classifying a particular flow in a classification tree ordered first by organizational departments, the attributes of the flow are compared with the traffic specification in each successive department node and if no match is found, then processing proceeds to the next subsequent department node. If no match is found, then the final compare is a default "match all" category. If, however, a match is found, then classification moves to the children of this department node. The child nodes may be ordered by an orthogonal paradigm such as, for example, "service type." Matching proceeds according to the order of specificity in the child nodes. Processing proceeds in this manner, traversing downward and from left to right in the classification tree, searching the plurality of orthogonal paradigms. Key to implementing this a hierarchy is that the nodes are arranged in decreasing order of specificity. This permits search to find the most specific class for the traffic before more general.

Table 2 depicts components from which Traffic classes may be built. Note that the orientation of the server (inside or outside) is specified. And as noted above, any traffic class component may be unspecified, i.e. set to match any value.

TABLE 2

Traffic Class Components

| Client Side | Server Side |
|---|---|
| IP Address/Domain Name | IP Address/Domain Name<br>TCP or UDP Service, e.g. WWW, FTP, RealAudio, etc.<br>URI for Web Service, e.g. "*.html", "*.gif", "/sales/*", etc. |

Figure 2A:
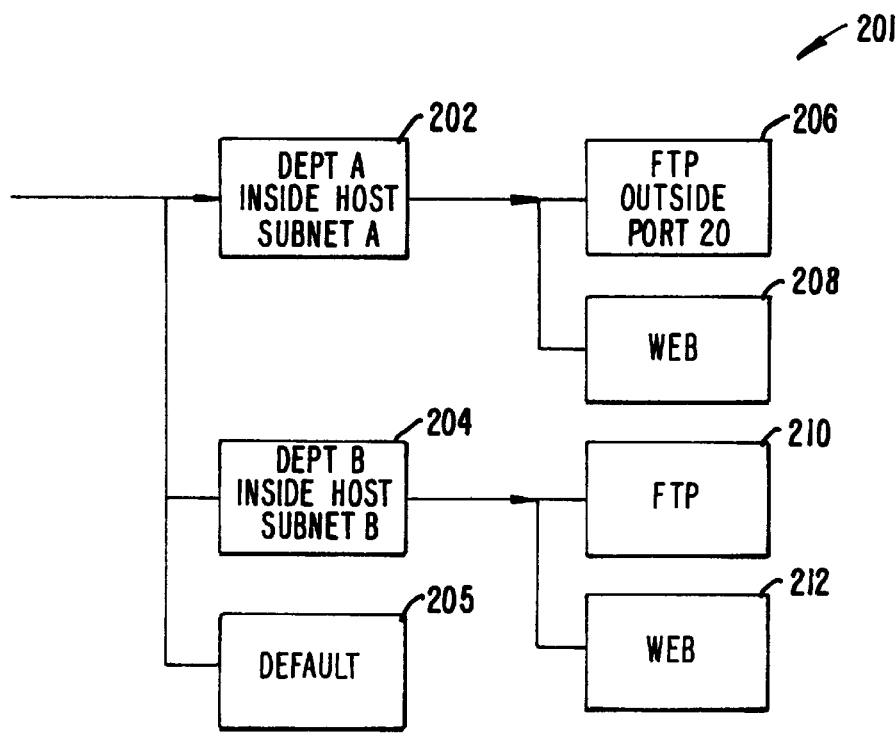
FIGS. 2A–2B depict representative divisions of bandwidth according to a particular embodiment of the invention.
Figure 2B:
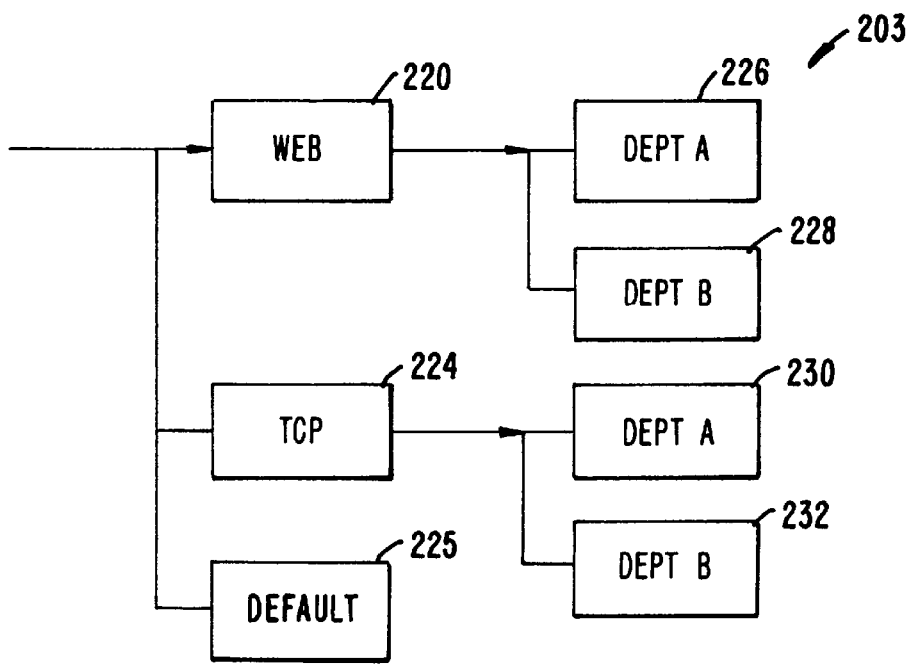

FIGS. 2A and 2B depict representative allocations of bandwidth made by a hypothetical network manager as an example. In FIG. 2A, the network manager has decided to divide her network resources first by allocating bandwidth between Departments A and B. FIG. 2A shows the resulting classification tree, in which Department A bandwidth resources 202 and Department B bandwidth resources 204 each have their own nodes representing a specific traffic class for that department. Each traffic class may have a policy attribute associated with it. For example, in FIG. 2A, the Department A resources node 202 has the policy attribute Inside Host Subnet A associated with it. Next, the network manager has chosen to divide the bandwidth resources of Department A among two applications. She allocates an FTP traffic class 206 and a World Wide Web server traffic class 208. Each of these nodes may have a separate policy attribute associated with them. For example, in FIG. 2A, the FTP node 206 for has an attribute Outside port 20 associated with it. Similarly, the network manager has chosen to divide network bandwidth resources of Department B into an FTP server traffic class 210 and a World Wide Web server traffic class 212. Each may have their own respective policies.

FIG. 2B shows a second example, wherein the network manager has chosen to first divide network bandwidth resource between web traffic and TCP traffic. She creates three traffic nodes, a web traffic node 220, a TCP traffic node 224 and a default node 225. Next, she divides the web traffic among two organizational departments by creating a Department A node 226, and a Department B node 228. Each may have its own associated policy. Similarly, she divides TCP network bandwidth into separate traffic classes by creating a Department A node 230 and a Department B node 232. Each represents a separate traffic class which may have its own policy.

All traffic which does not match any user specified traffic class falls into an automatically created default traffic class which has a default policy. In a preferable embodiment, the default policy treats default class flows as unreserved traffic at the default (medium) priority. In FIG. 2A, the default category is depicted by a default node 205, and in FIG. 2B, the default category is depicted by a default node 225.

2.2 Creating Policies 2.2.1 Reserved vs. Unreserved

Network managers create policies in order to assign service levels to traffic classes which are of particular interest. Service levels may be either reserved or unreserved. Reserved service is useful in instances where traffic 'bursts', i.e., sends chunks of data, or in interactive applications, which require a minimum bandwidth in order to function properly.

Reserved service is defined in terms of scaled rate, unreserved service is defined in terms of priority. Allocation of bandwidth resources by scaled rate is accomplished in a process known as "speed scaling" wherein the speed of the underlying network link upon which the flow is carried is detected and available bandwidth is allocated based upon this detected speed. Allocation of bandwidth resources for unreserved service is priority based. The total bandwidth resources for unreserved service demanded by all flows is satisfied according to a prioritized scheme, in which highest priorities are satisfied first, followed by successively lower priority applications. Unreserved service allocations are based upon the available bandwidth after reserved service demands have been satisfied.

Traffic may be a combination of reserved and unreserved services. For example, web traffic may have a service level defined at a web server for "*.html" to designate these types of files as traffic allocated unreserved service, as these are typically small files. In the same web server, "*.gif" files may be designated as a separate traffic class receiving reserved service. TCP connections and UDP sessions may be defined for reserved service.

2.2.2 Reserved Service: GIR vs. EIR

Reserved service may have both a guaranteed information rate (GIR) and an excess information rate (EIR) components. Guaranteed information rate represents a commitment of bandwidth resources to maintain a specified rate. Excess information rate is an allocation of bandwidth resources on an "as available" basis. Guaranteed information rate prevents evident lack of progress situations, such as stuck progress indicators, from occurring. Excess rate is allocated from available bandwidth, i.e. that which has not consumed by providing guaranteed rate service. As flows demand excess information rate at different priority levels, their demands are satisfied in order of priority level. For example, in an application having a ten voice over IP sessions, each session requiring a minimum of eight kilobits of bandwidth rate which must be guaranteed and up to 8 kilobits of additional bandwidth rate which may be used from time-to-time, would be allocated reserved service comprised of eight kilobits of guaranteed information rate for each of the ten sessions. Then, from the remaining available bandwidth resources, eight kilobits of excess information rate is allocated to each session based upon the priority of each session, until either all demands have been satisfied, or bandwidth resources are completely consumed.

When a guaranteed information rate cannot be provided to a requesting flow due to insufficient bandwidth resources, an admissions policy is invoked. The admissions policy may refuse a connection, display an error message or a combination of both. Admissions policies prevent service 'brown outs' which would otherwise occur if guaranteed information rate demand exceeds available bandwidth resources. By contrast, excess information rate requirements are not guaranteed. If a flow's request for excess information rate is not able to be satisfied from the available bandwidth resources, it is simply not met. In the previous example, if insufficient bandwidth existed in order to accommodate the ten voice over IP sessions, an admissions policy would be invoked.

Excess information rate (EIR) is redistributed each time a new flow is created, an existing flow is terminated, or a substantial change in demand for unreserved priority level occurs. By contrast, Guaranteed information rate (GIR) is allocated only at the time of creation of a flow and freed when the flow terminates.

In a preferable embodiment, reserved TCP service levels may be enforced by TCP Rate Control for both inbound and outbound traffic. TCP Rate Control is a technique well known to persons of ordinary skill in the art which scales reserved flows as excess rate is available without incurring retransmission.

2.3 Isolating Bandwidth Resources for Traffic Classes

Bandwidth resources may be dedicated to certain traffic classes. There are two degrees of isolation. Hard isolation creates an entirely separate logical channel for designated traffic classes. For example, department A and department B could both be hard isolated, setting up two logical 0.75 Mbps channels on a T1 access link, one for each department. With hard isolation, unused bandwidth in either channel would not be shared with the other department's traffic.

Hard isolation involves allocating arbitrary subsets of access link bandwidth for any traffic class or family of traffic classes. It completely protects the traffic belonging to the respective class or classes, but this protection comes at the cost of forsaken opportunities to share unused bandwidth.

Soft isolation allows sharing of unused bandwidth, but limits the amount of guaranteed bandwidth that can be allocated to any particular traffic class at any one time. This provides a basic level of fairness between traffic classes which have corresponding guaranteed service policies. But this fairness does not come at the cost of efficiency gains accrued from sharing available bandwidth.

3.0 System Function 3.1 Building a Traffic Classification Tree

Figure 2C:
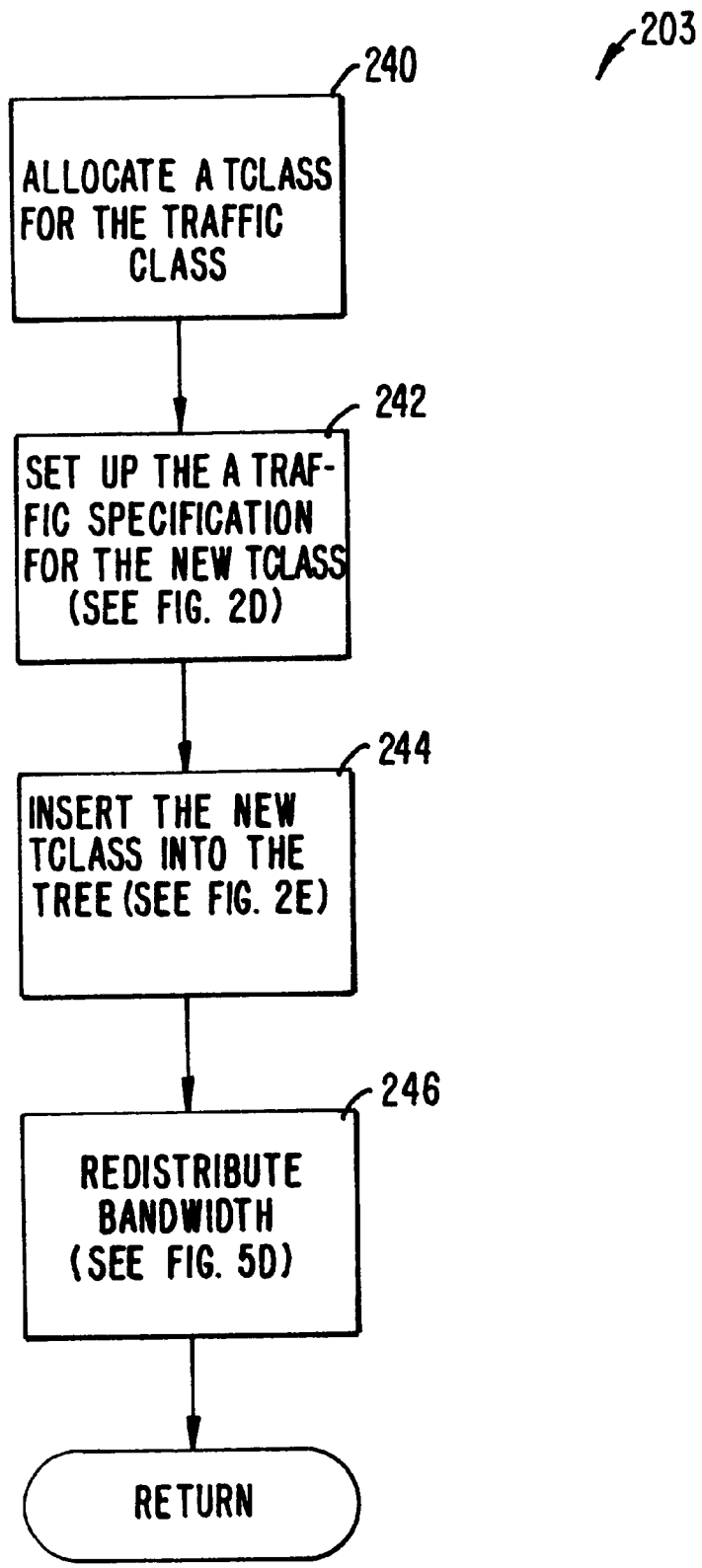
FIGS. 2C–2E are flow charts depicting process steps according to a particular embodiment of the invention.

FIG. 2C depicts a flowchart 203 showing the process steps in building a classification tree, such as classification tree 201 of FIG. 2A, by adding traffic class nodes, such as traffic class node 206, in order of specificity of classes. In a step 240, a new tclass node is allocated for the traffic class which is to be added to the classification tree. Next, in a step 242, a traffic specification is inserted for the new traffic class node, allocated in step 240. Then, in a step 244, the new tclass node is inserted into the classification tree. Next, in a step 246, bandwidth resources allocated based upon the traffic class hierarchy is redistributed to reflect the new hierarchy.

Figure 2D:
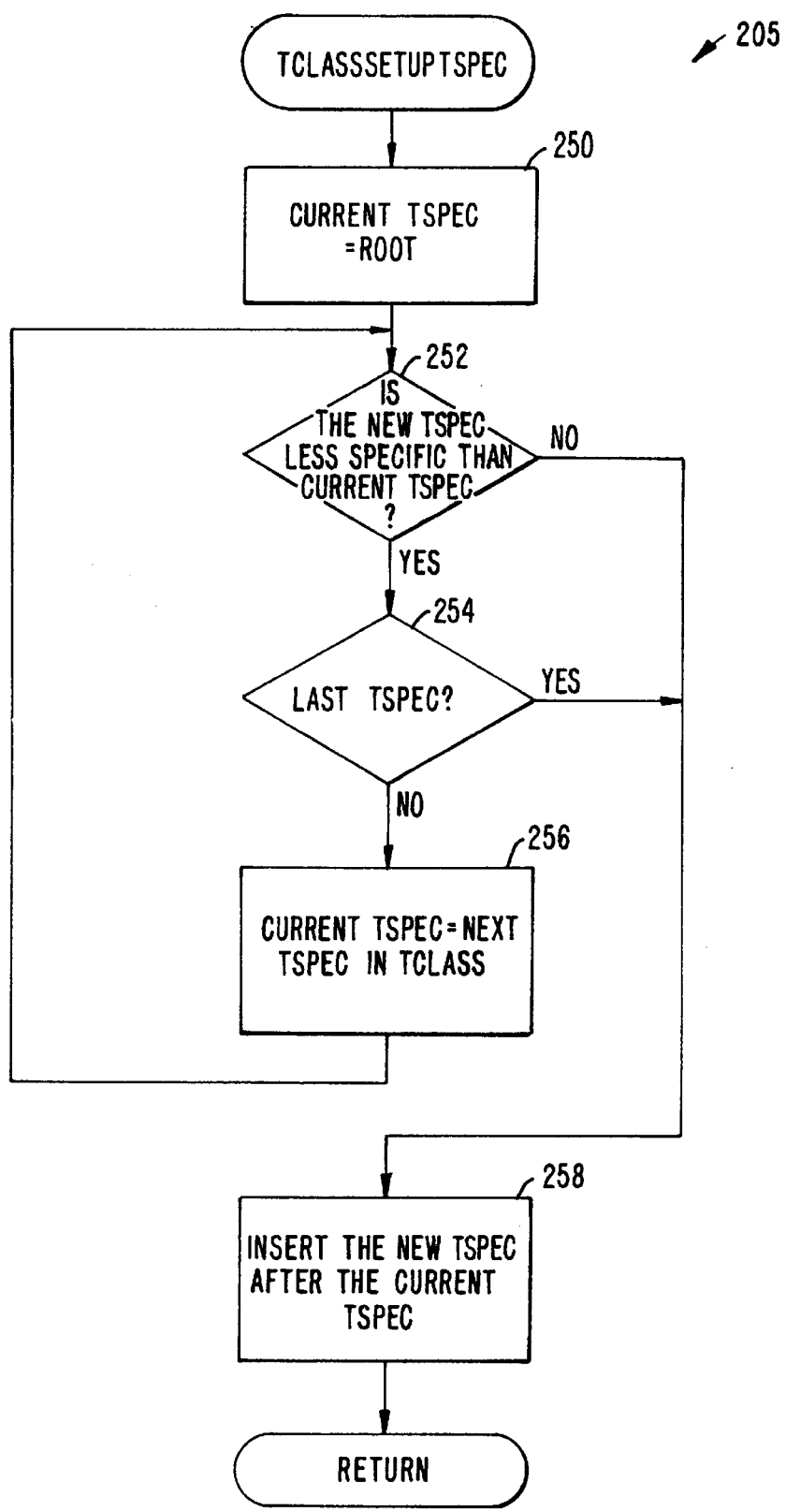

FIG. 2D depicts a flowchart 205 showing the component steps of traffic specification creation step 242 of FIG. 2C. The processing steps of flowchart 205 insert a traffic specification, or tspec, into the traffic class allocated in step 240. In a step 250, a current tspec is initialized to the first tspec in the tclass. Next, in a decisional step 252, a determination is made whether the new tspec is less specific than the current tspec, initialized in step 250. If this is not the case, then in a step 258, the new tspec is inserted after the current tspec, and processing returns. Otherwise, in a decisional step 254, a determination is made whether this is the final tspec in the traffic class. If this is so, then in step 258, the new tspec is inserted after the last (current) tspec. Otherwise, in a step 256, the next tspec in the traffic class is examined by repeating processing steps 252, 254, 256 and 258.

Figure 2E:
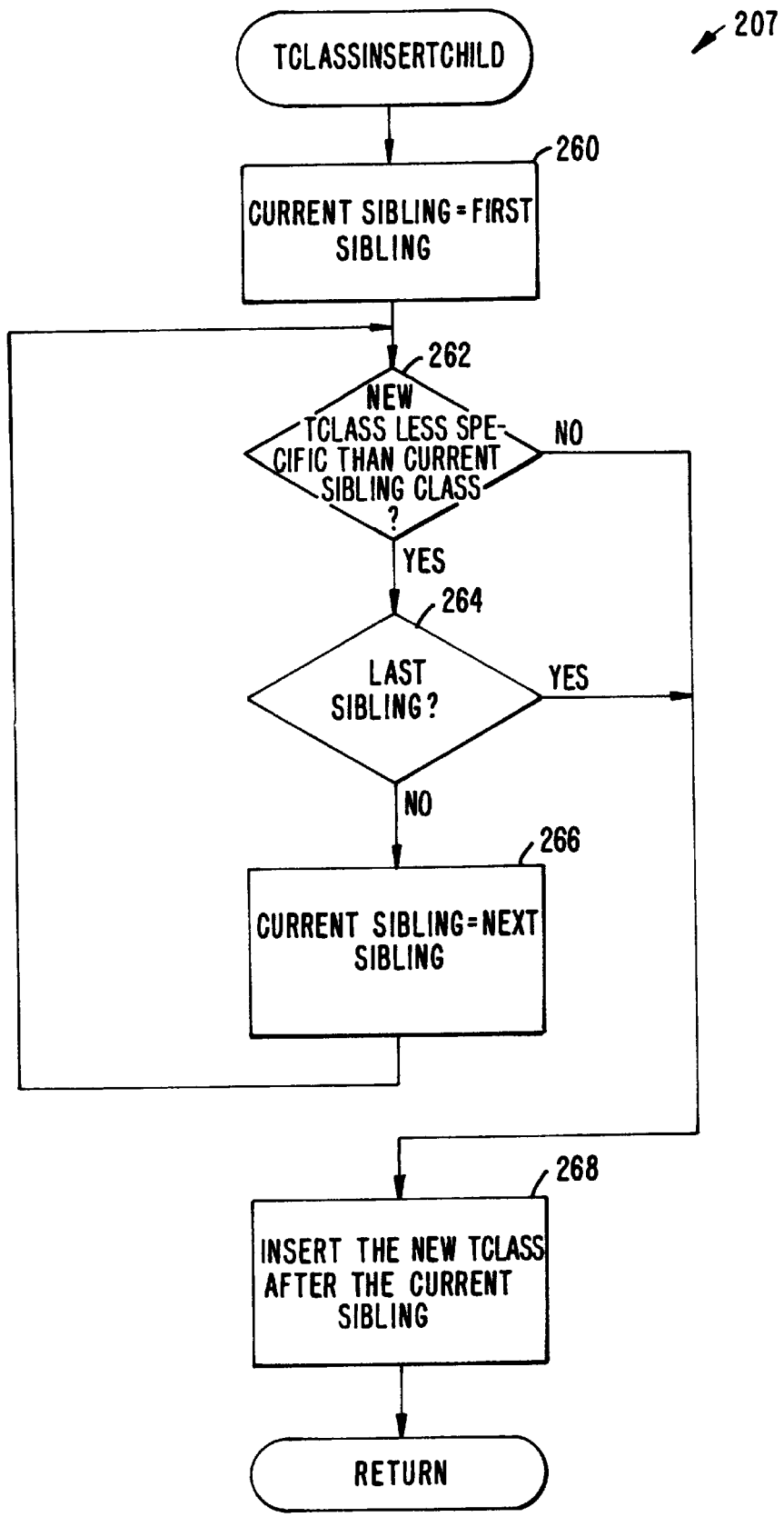

FIG. 2E depicts a flowchart 207 showing the component steps of traffic specification creation step 244 of FIG. 2D. The processing steps of flowchart 207 insert the traffic class, or tclass, allocated in step 240 into the classification tree. In a step 260, a current sibling is initialized to the first sibling in the parent tclass. Next, in a decisional step 262, a determination is made whether the new tclass is less specific than the current sibling, initialized in step 260. If this is not the case, then in a step 268, the new tclass is inserted after the current sibling, and processing returns. Otherwise, in a decisional step 264, a determination is made whether this is the final sibling in the parent tclass. If this is so, then in step 268, the new tclass is inserted after the last (current) tclass. Otherwise, in a step 266, the next sibling in the parent traffic class is examined by repeating processing steps 262, 264, 266 and 268.

3.2 Allocating Bandwidth based upon Policy

Figure 3:
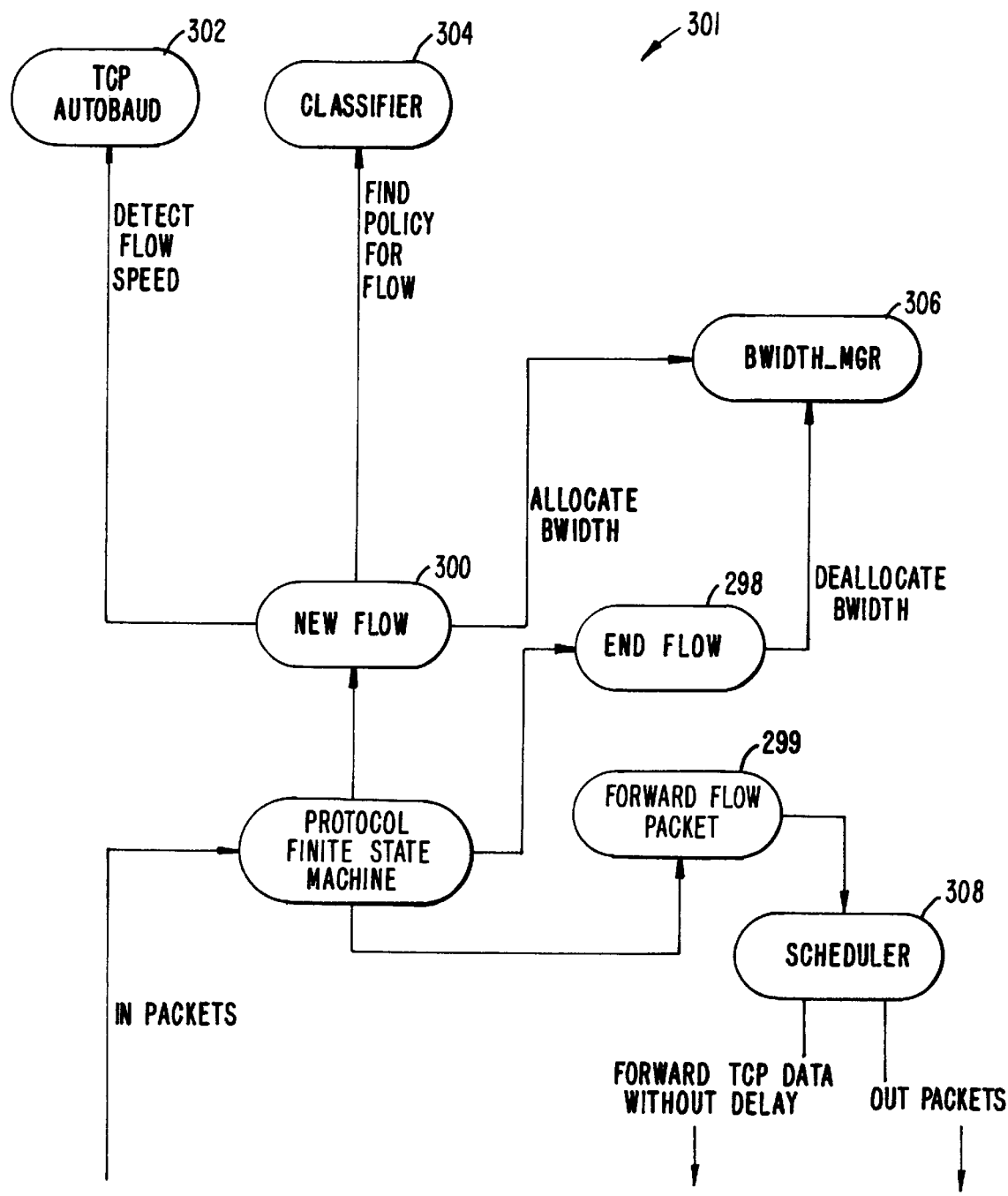
FIG. 3 is a block diagram of a particular embodiment according to the invention.

FIG. 3 depicts a functional block diagram 301 of component processes in accordance with a particular embodiment of the present invention. Processing of a new flow, such as new flow 300 as described by a flowchart 501 in FIG. 5A, begins with a TCP autobaud component 302, which implements the automatic detection of flow speeds as depicted in FIG. 1E. TCP autobaud component 302 determines values for selectable information such as flow data rate of new flow 300. A classifier 304 determines the class for the new flow using the information determined by TCP autobaud 302. Having classified the traffic, the classifier next determines an appropriate policy for this particular flow from a classification tree (not shown). Based upon the policy, the classifier then determines a service level for the new flow. A bandwidth manager 306 uses the policy determined by classifier 304 in order to allocate bandwidth according to the service level prescribed by the policy.

Figure 4A:
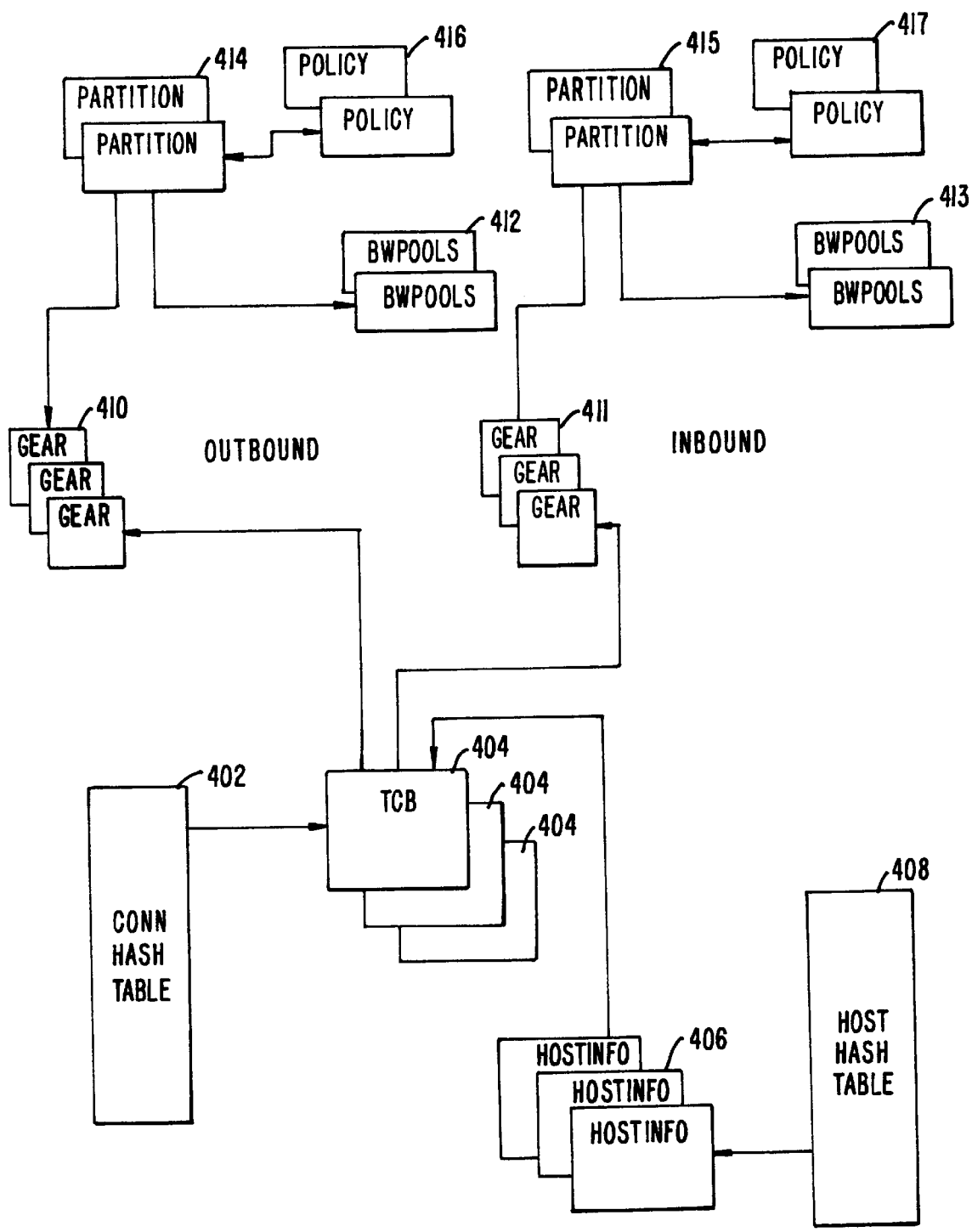
FIG. 4A is a block diagram of a data structure according to a particular embodiment of the invention.

FIG. 4A depicts data structures in a particular embodiment according to the invention. The bandwidth management aspect of the present invention is performed between inside clients and servers and the access link. Outside clients and servers are on the other side of the access link. In the embodiment of FIG. 4A, Traffic is directional. Inbound (flowing from an outside host to an inside host) traffic is managed entirely separately from outbound traffic.

A connection hash table 402 facilitates indexing into a plurality of TCP connections, each TCP connection having an associated flow, such as flows 300, 299 and 298 of FIG. 3. A plurality of TCP control blocks 404 are used to track connection-related information for each TCP connection. Host-related information is tracked using a plurality of host information control blocks 406, indexed by a host hash table 408. Information about particular hosts corresponding to TCP connections is tracked using the TCP control block 404.

Figure 5A:
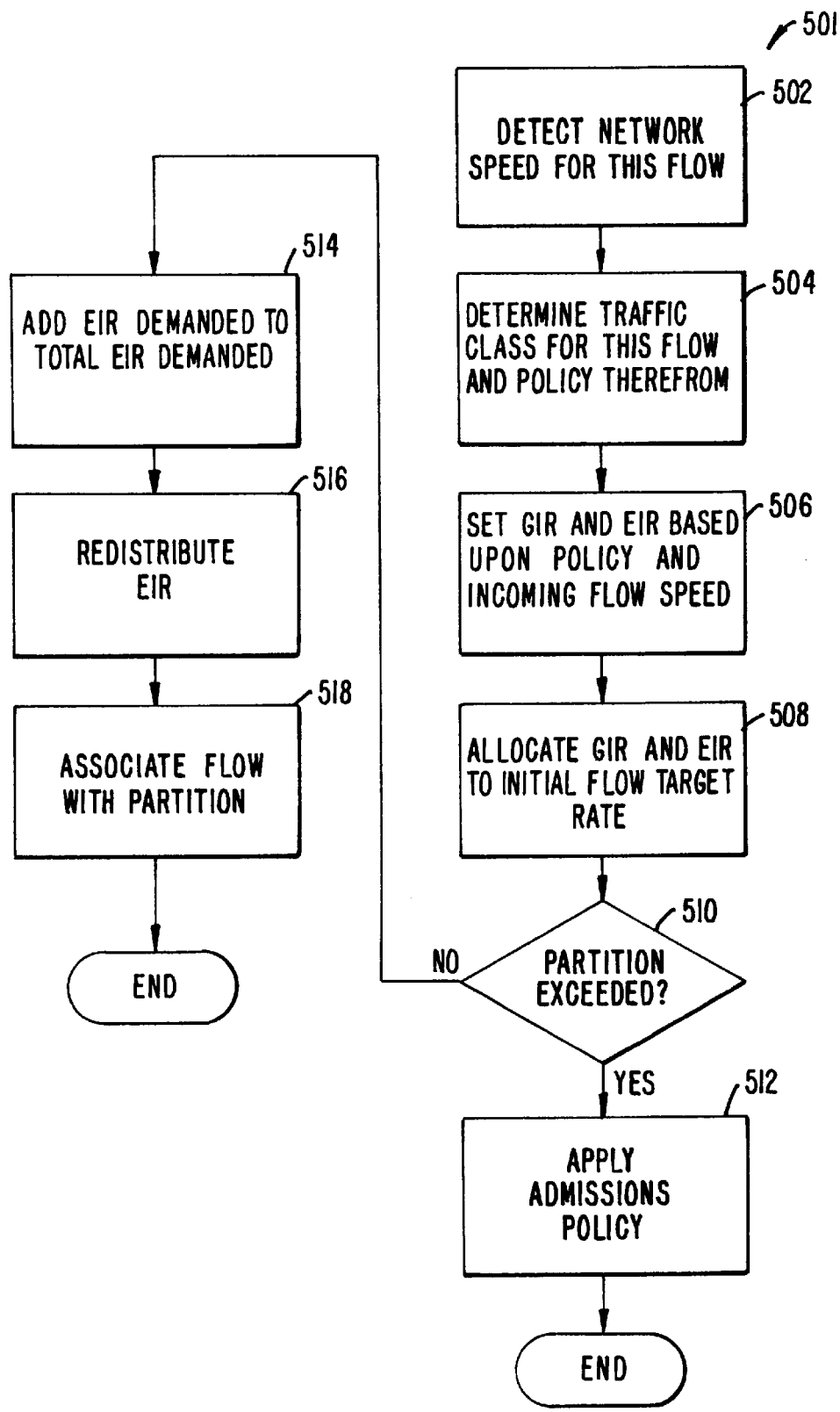
FIGS. 5A–5H are flow charts depicting process steps according to a particular embodiment of the invention.

Each TCP connection represented by TCP control block 404 has associated with it a gear 410 representing an outbound flow and a gear 411 representing an inbound flow. Each gear is an internal data object associated with a particular TCP connection or UDP session. Gears are protocol independent and contain rate-based information. Since network resources are managed separately for inbound and outbound traffic in this particular embodiment, there is a bandwidth pool 412 for outbound traffic and a bandwidth pool 413 for inbound traffic. Bandwidth pools represent collections of available network resources managed by bandwidth manager 306. Bandwidth pools are arbitrarily divided into a partition 414 in the outbound path, and a partition 415 in the inbound path. Each partition represents an arbitrarily-sized portion of available network resource. Gears become associated with particular partitions during the beginning of flow management for the new flow in step 518 of FIG. 5A. A policy 416 in the outbound path and a policy 417 in the inbound path become associated with partition 414 in the outbound path and partition 415 in the inbound path during the beginning of management of a new flow, as shown in FIG. 5A. These policies are associated with particular flows according to the traffic class that classifier 304 assigns to the particular flow.

FIG. 5A depicts flowchart 501 of the steps taken in initiating a new flow in accordance with a particular embodiment of the invention. In a step 502, TCP autobaud component 302 detects a TCP data rate of new flow 300. In a step 504, classifier 304 classifies the new flow to determine a policy. Classification is described in greater detail in FIG. 5F herein below. In a step 506, based upon the policy determined in step 504, a guaranteed information rate (GIR) and an excess information rate (EIR) are determined and speed scaled to the incoming TCP data rate, detected in step 502. Speed scaling is described in greater detail in FIGS. 5G and 5H herein below. In a step 508, bandwidth manager 306 allocates guaranteed information rate resources and excess information rate resources to accommodate an initial target rate for the new flow. In a decisional step 510, bandwidth manager 306 determines if a partition limit would be exceeded by the allocation determined in step 508. If this is the case, then in a step 512, an admissions policy is invoked. Otherwise, in a step 514, the excess information rate resources demanded by new flow 300 is added to a total excess information rate resources demanded for this bandwidth pool. In a step 516, excess information rate resources are redistributed with respect to all flows within the partition, if demand has changed substantially since the last time it was redistributed. FIG. 5E depicts a flowchart 509 showing the steps in reapplying demand satisfaction parameters to all traffic flows in the bandwidth pool. A new target rate and total excess information rate resources are calculated. Finally, in a step 518, the new flow is associated with a partition.

Figure 5B:
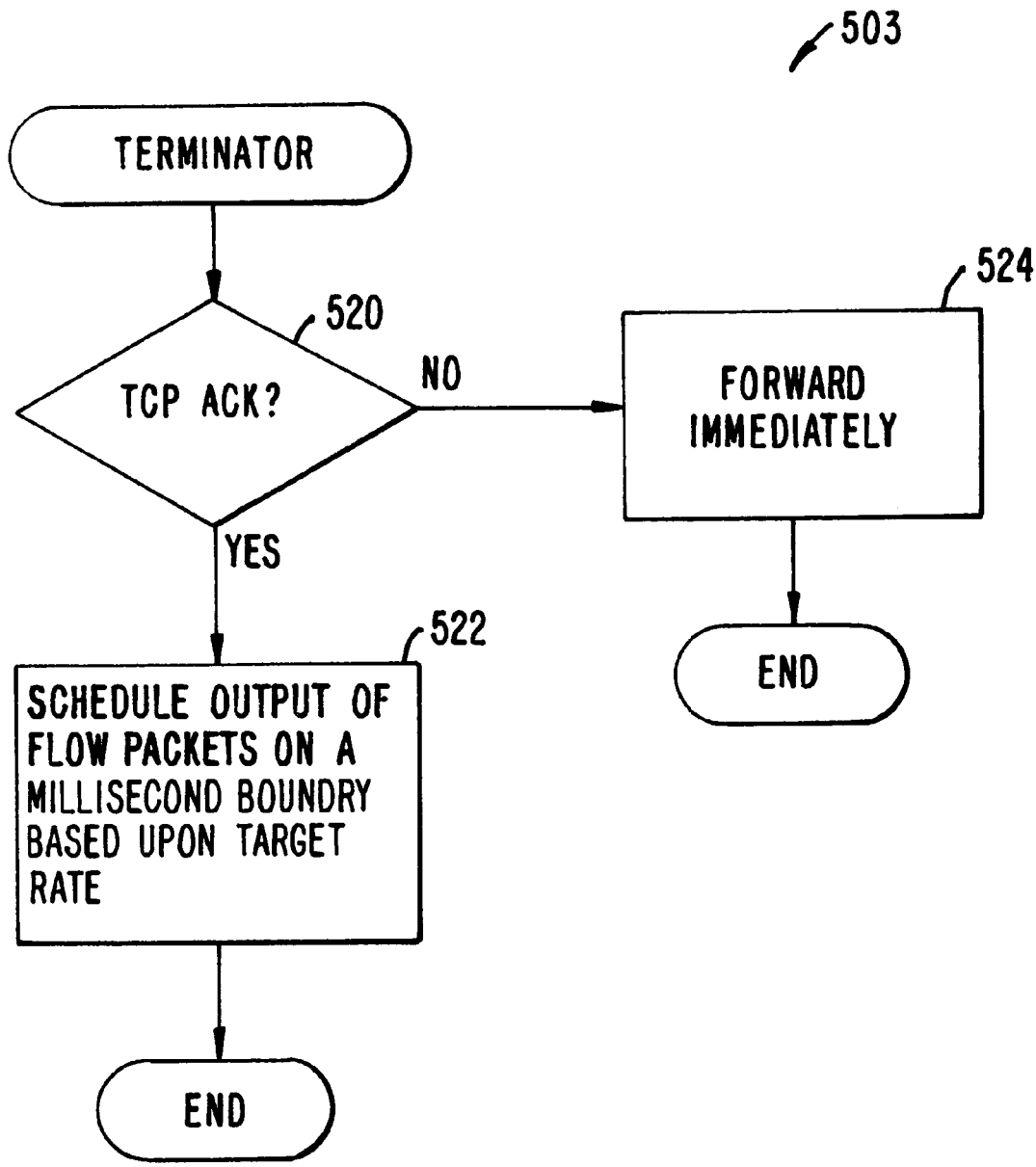

FIG. 5B depicts a flowchart 503 showing processing of a packet belonging to an existing flow such as a forward flow packet 299. In a decisional step 520, a scheduler 308, using policy information determined at flow initiation, filters TCP acknowledgments for scheduling in a step 522. Output times are scheduled on millisecond boundaries, based upon the target data rate computed in step 508 of FIG. 5A. In as step 524, the remaining packets are delivered immediately to TCP, which performs just in time delivery.

Figure 5C:
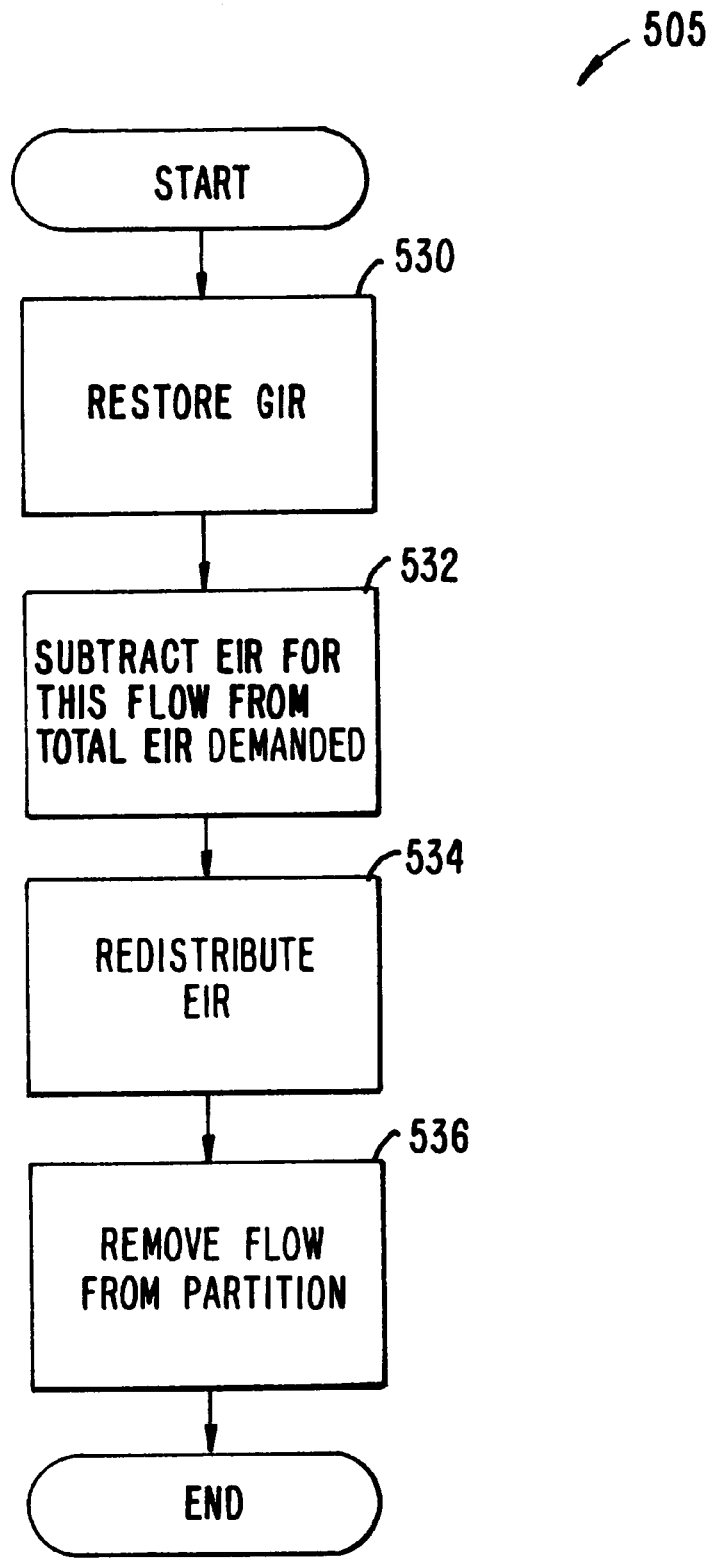

FIG. 5C depicts a flowchart 505 showing processing by bandwidth manager 306 of a packet at the termination of a flow, such as an end flow packet 298. In a step 530, guaranteed information rate resources are restored. In step 532, excess information rate resources demanded by the terminating flow 298 is subtracted from the total excess information rate resources demanded. In a step 534, excess information rate resources are redistributed as described in FIG. 5D. Finally, in a step 536, the flow is removed from its partition.

Figure 4B:
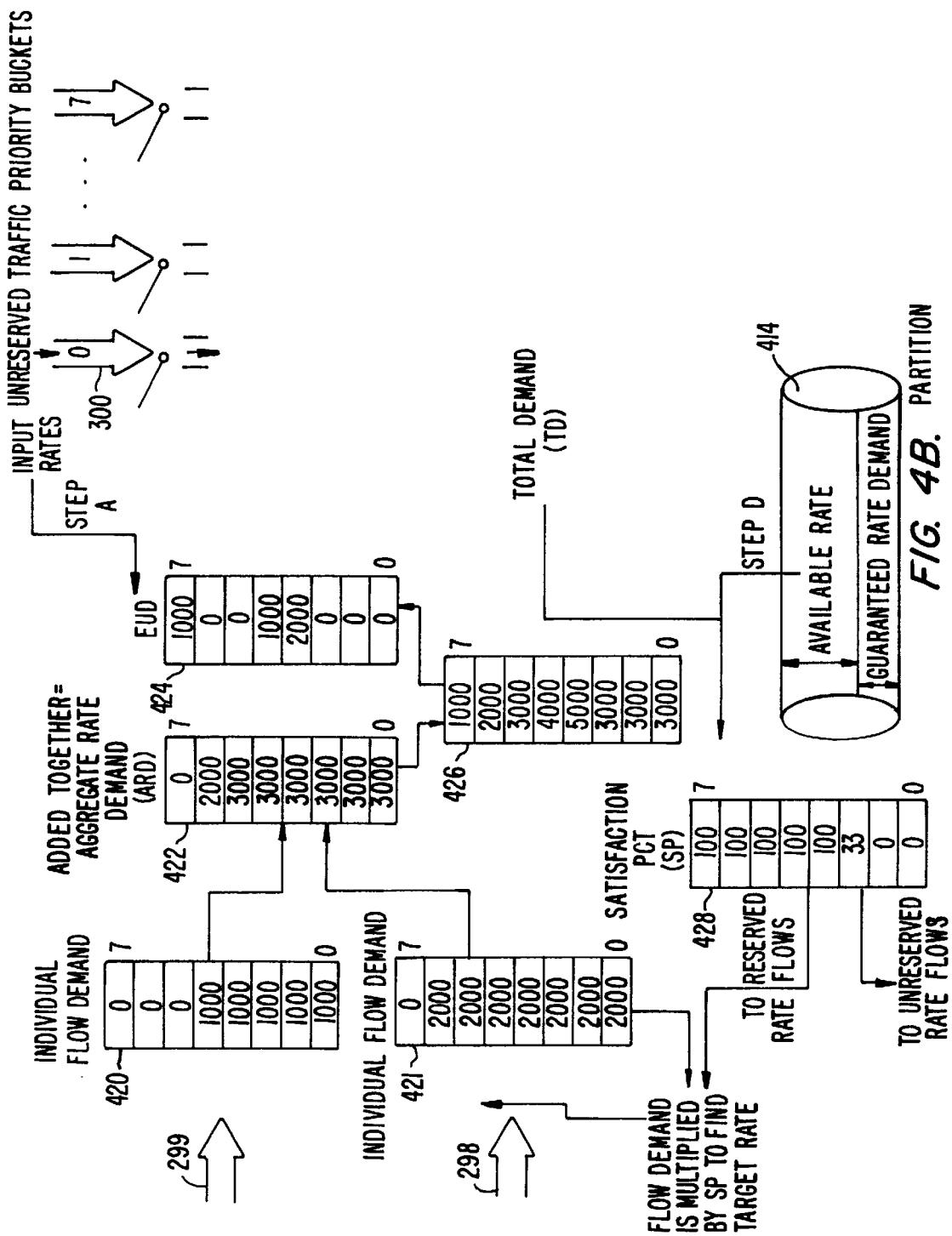
FIG. 4B is a block diagram of data structure according to a particular embodiment of the invention.

FIG. 4B depicts specific data structures used in redistributing unreserved service resources among multiple flows in a particular partition. Input rates of particular flows, such as new flow 300, are measured by TCP autobaud component 302 and used to determine an Extrapolated Unreserved Demand or (EUD) 424. Flows requiring excess information rate resources, such as flows 299 and 298, having gears 410 and 411 (not shown), respectively, have associated with them an individual flow demands 420 and 421. The individual flow demands of all flows in a particular partition are added together to form an Aggregate Rate Demand (ARD) 422 at each priority level. Aggregate rate demand is added to extrapolated unreserved demand 424 to arrive at a total instantaneous demand 426. The total instantaneous demand is satisfied from the highest priority, priority 7, downward based upon the available excess information rate resources in the partition 414. This available rate is information rate which has not been used to satisfy guaranteed information rate demands. From the available excess information rate resources, a satisfaction percentage vector 428 is computed having the percentage of each priority of flow which may be satisfied in the total demand vector 426 by the available excess information rate resources in partition 414. Individual flow demand vectors 420 and 421 are each multiplied by the satisfaction percentage for each priority 428 in order to arrive at a target rate which is incorporated in gears 410 and 411 corresponding to each flow. The satisfaction percentage vector 428 is also applied to the Extrapolated Unreserved Demand (EUD) 424 to determine unreserved targets.

3.3 Reconciling Needs for Bandwidth

Figure 5D:
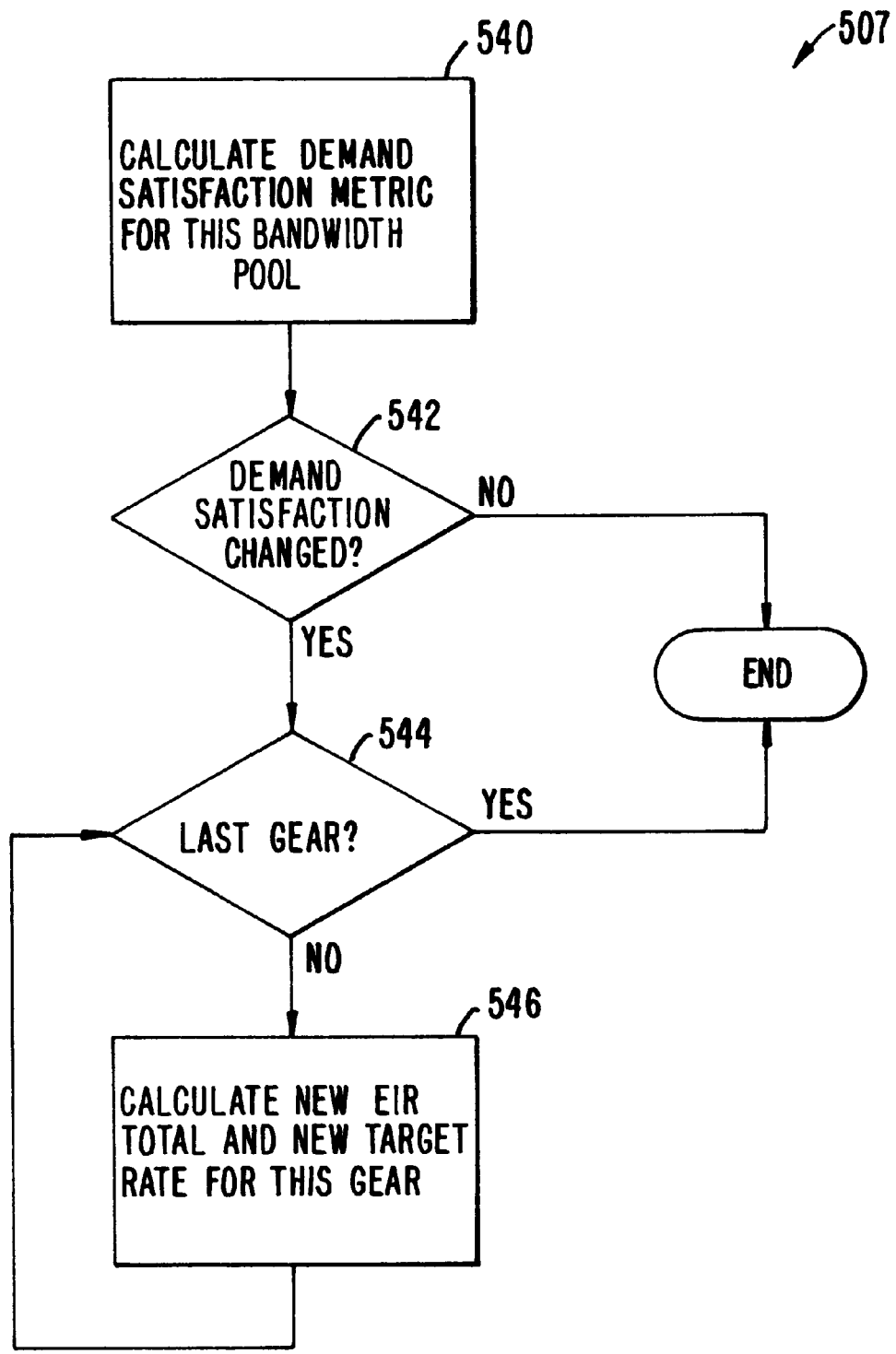
Figure 5E:
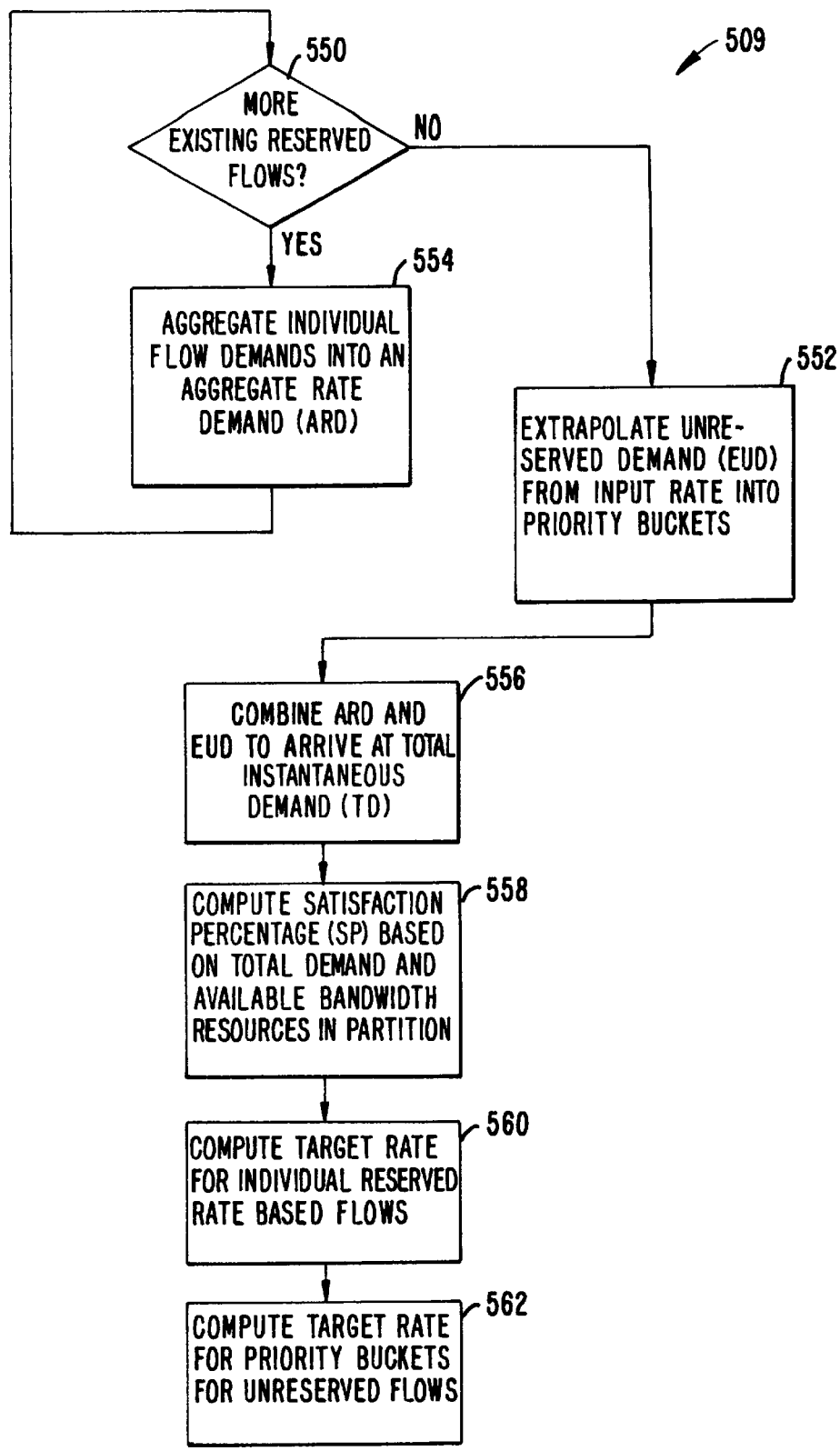

FIG. 5D depicts flowchart 507 of the processing steps to redistribute excess information rate resources with respect to reserved service flows within a given partition. In a step 540, a demand satisfaction metric is computed for the bandwidth pool being redistributed. In a decisional step 542, a determination whether the demand satisfaction metric computed in step 540 has changed substantially since the last time demand was redistributed. If this is the case, then in a decisional step 544, a loop is entered for each gear associated with the partition owning the bandwidth pool being redistributed. In a step 546, demand satisfaction parameters are reapplied a traffic flow associated with each gear and a new target rate and a new total excess information rate resources are calculated. Processing continues until in decisional step 544, it is determined that all gears have been processed.

FIG. 5E depicts flowchart 509 of the processing steps for reconciling bandwidth among a plurality of flows, requiring reserved service and unreserved service resources. For example, partition 414 of FIG. 4B has unreserved service flow 300 and reserved service flows 299 and 298. In a decisional step 550, a loop is formed with a step 554, in which the individual flow demands of reserved service flows, such as flows 299 and 298 in partition 414, are added together to form an aggregate rate demand (ARD) 422. Next, in a step 552, an extrapolated unreserved demand (EUD) 424 is determined from the input rate of unreserved service traffic 300 in partition 414. In a preferable embodiment, the EUD must be inflated in order to promote growth in traffic. This is done to accommodate the elastic nature of TCP traffic. Next, in a step 556, the EUD determined in step 552 and the ARD determined in step 554 are combined to form an instantaneous total demand (TD) 426 for the entire partition 414. The total instantaneous demand is satisfied from the highest priority level, level 7, downward based upon the available unreserved resources in the partition 414. In a step 558, a satisfaction percentage vector (SP) 428 is computed for the partition from the total demand vector (TD) 426 determined in step 556. The satisfaction percentage indicates that percentage of the demand at each priority level that can be satisfied from the unreserved resources in the partition. Next, in a step 560, a target rate for reserved rate based flows, such as flows 299 and 298, is computed. Finally, in a step 562, a target rate for unreserved priority based flows, such as flow 300, is computed.

3.4 Searching a Classification Tree

Figure 5F:
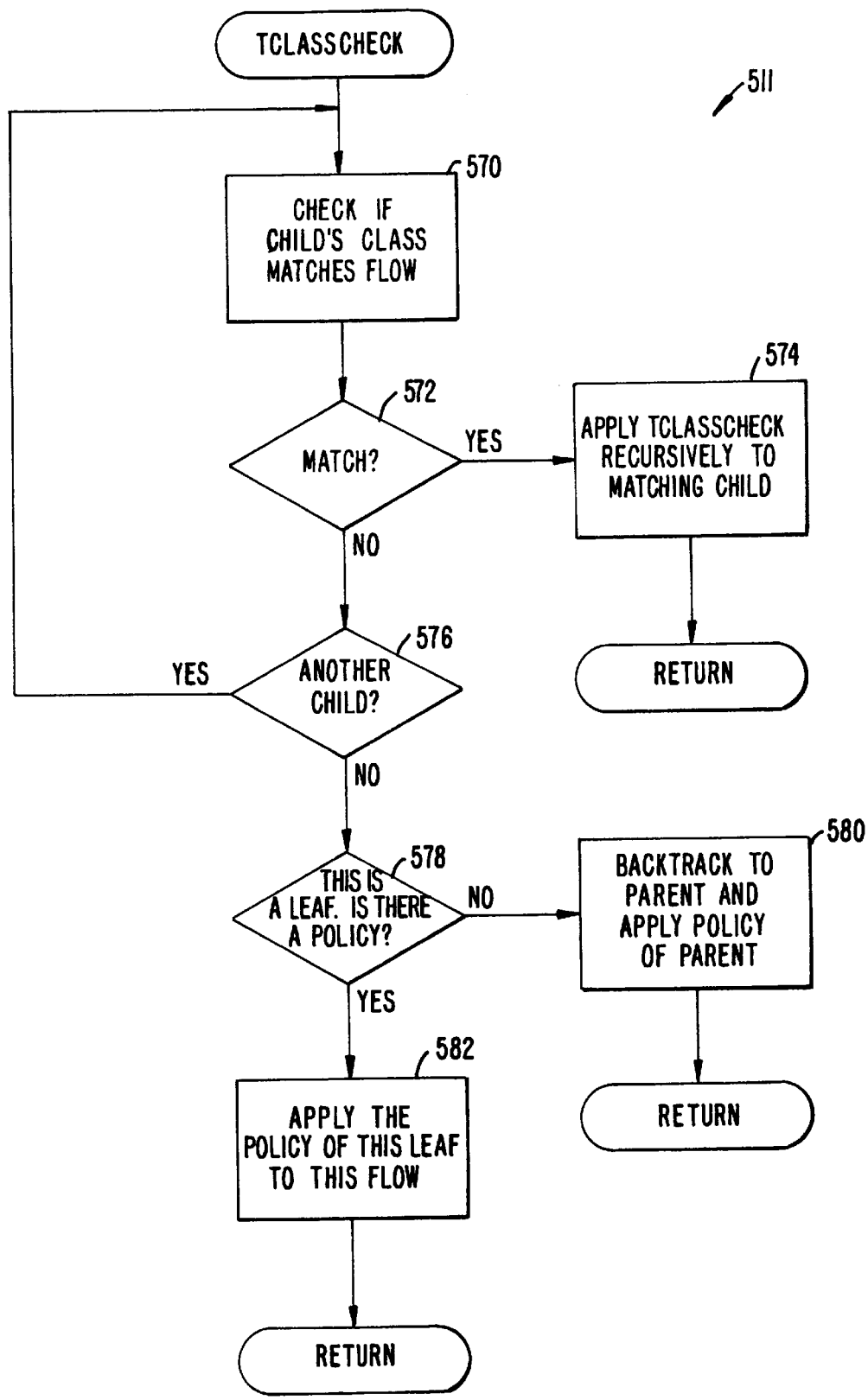

FIG. 5F depicts a flowchart 511 showing the component steps of traffic classification step 504 of FIG. 5A. The processing steps of flowchart 511 determine a class and a policy for a flow, such as new flow 300, by traversing a classification tree such as the classification tree 201 in FIG. 2A. Processing begins with a first node in the classification tree 201, such as department A node 202. In a step 570, a traffic specification of a child node, such as FTP node 206 is compared with a flow specification of the new flow 300. In a decisional step 572, if a match is discovered, then in a step 574, the processing of flowchart 511 is applied to the child node 206 recursively. Otherwise, if child node 206 does not match the new flow, then in a decisional step 576, processing determines whether any sibling nodes exist for the child node 206. If processing detects the existence of a sibling of child node 206, such as child node 208, then processing continues on node 208 with step 570. Otherwise, if there are no further child nodes for node 202, then in a decisional step 578, a determination is made whether the node is a leaf node having a policy. If no policy exists, then in a step 580, processing backtracks to a parent node and looks for a policy associated with the parent node to apply to the new flow 300. Otherwise, if a policy is associated with the node 202, then in a step 582, the policy is associated with the new flow 300.

3.5 Speed Scaling

Figure 5G:
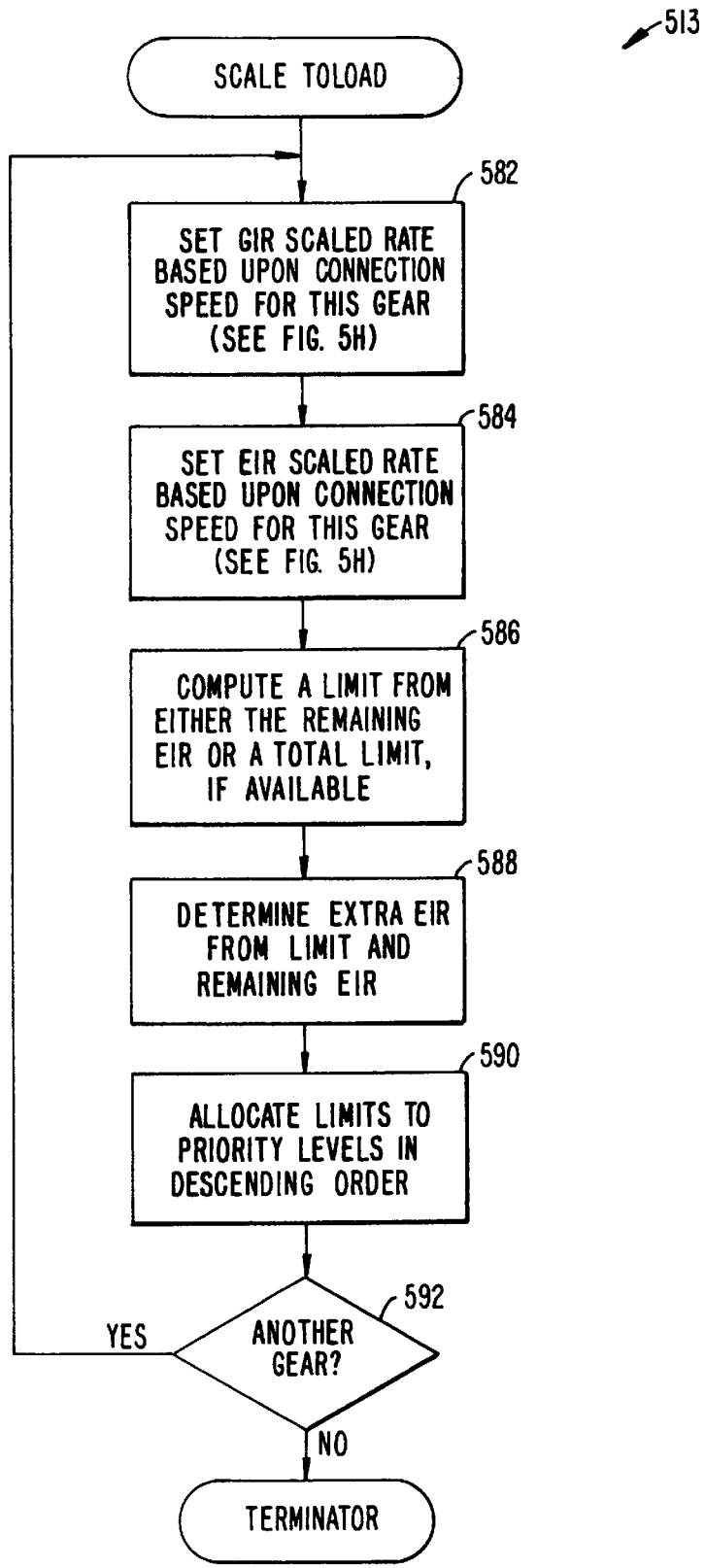

FIG. 5G depicts a flowchart 513 showing the component steps of speed scaling step 506 of FIG. 5A. The processing steps of flowchart 513 determine an acceptable allocation of bandwidth to reserved service flows, i.e., GIR and EIR, by allocating rate for each gear, such as gears 410 and 411, based upon individual flow demands, base limits and total limits. In a step 582, scaled rate for GIR is set based upon a connection speed detected by TCP autobaud component 302 for a particular flow, such as flow 299, having a gear, such as gear 410. Then in a step 584, scaled rate for EIR is set based upon a connection speed detected by TCP autobaud component 302 for a particular flow, such as flow 298, having a gear, such as gear 411. Next, in a step 586, a limit is computed from either the available EIR remaining after the allocation to flow 299 in step 584, or from a total limit, if such a limit is specified. Then, in a step 588, a determination is made whether any extra EIR resource remains after the limit computed in step 586 has been satisfied. Then, in a step 590, limits computed in step 586 are allocated to flows, such as flow 299 and flow 298, in order of descending priority level. In a decisional step 592, the processing of steps 582 through 592 are applied to subsequent gears, if any.

Figure 5H:
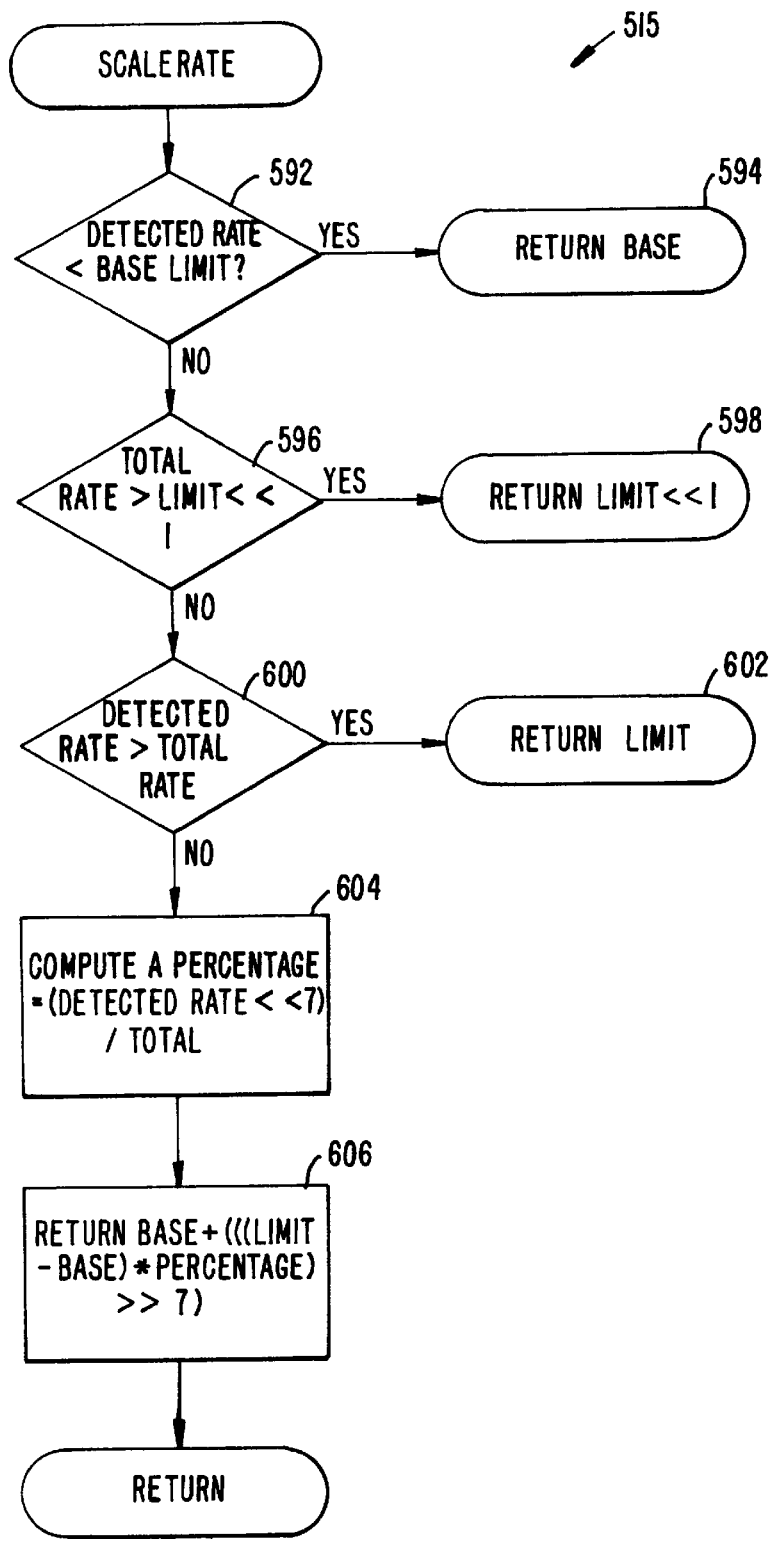

FIG. 5H depicts a flowchart 515 showing the component steps of scaled rate setting steps 582 and 584 of FIG. 5G. The processing steps of flowchart 515 determine whether the rate of the underlying link detected by TCP autobaud 302 exceeds limits imposed on the network. In a decisional step 592, a determination is made whether the detected speed of a flow is less than a base limit minimum. If this is so, then in a step 594, the base limit is returned as the scaled rate. Otherwise, in a decisional step 596, a determination is made whether the total rate of all flows is greater than a maximum limit. If this is so, then in a step 598, the maximum limit is returned as the scaled rate. Otherwise, in a decisional step 600, a determination is made whether the detected speed of a flow is greater than a total rate of all flows. If this is so, then in a step 602, the maximum limit is returned as the scaled rate. Otherwise, in a step 604, a percentage of the total rate, represented by the maximum limit, is computed. Then, in a step 606, the percentage computed in step 604 is applied to a total rate available, i.e., the maximum limit-base (minimum) limit. The result is returned as the scaled rate.

4.0 Conclusion

In conclusion, the present invention provides for a policy based bandwidth allocation method for IP packet telecommunications systems wherein bandwidth is allocated to requesting flows according to automatically determined application requirements. An advantage of network management techniques according to the present invention is that network managers need only define traffic classes which are of interest. A further advantage of the present invention is that traffic classes may include information such as a URI for web traffic. A yet further advantage of the present invention is that service levels may be defined in terms of explicit rates, may be scaled to a remote client or server's network access rate, specified for high speed and low speed users and defined in terms of a guaranteed minimum service level.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for allocating bandwidth in a packet telecommunication system having any number of flows, including zero using a classification paradigm comprising the steps of:

parsing a packet into a flow specification, wherein said flow specification contains one or more instances of any of the following:
a protocol family designation,
a direction of packet flow designation,
a protocol type designation,
a plurality of hosts,
a plurality of ports,
in http protocol packets, a pointer to a URL; thereupon, matching the flow specification of the parsing step to a plurality of hierarchically-recognized classes represented by a plurality of nodes, each node having a traffic specification and a mask, according to the mask; thereupon, having found a matching node in the matching step, associating said flow specification with one of said plurality of hierarchically-recognized classes represented by a plurality nodes; and allocating bandwidth resources according to a policy associated with said class by allocating a combination of GIR resources, EIR resources and unreserved resources based upon speed scaling and unreserved resources are allocated based upon a priority, including detecting speed of a network link upon which said flow is transported to obtain a network link speed;

allocating available bandwidth resources based upon the speed detected.

2. A method for allocating bandwidth in a packet telecommunication system having any number of flows, including zero, using a classification paradigm comprising the steps of:

parsing a packet into a flow specification, wherein said flow specification contains one or more instances of any of the following:
a protocol family designation,
a direction of packet flow designation,
a protocol type designation,
a plurality of hosts,
a plurality of ports,
in http protocol packets, a pointer to a URL; thereupon, matching the flow specification of the parsing step to a plurality of hierarchically-recognized classes represented by a plurality of nodes, each node having a traffic specification and a mask, according to the mask, thereupon, having found a matching node in the matching step, associating said flow specification with one of said plurality of hierarchically-recognized classes represented by a plurality nodes; and allocating bandwidth resources according to a policy associated with said class by allocating a combination of GIR resources, EIR resources and unreserved resources based upon speed scaling and unreserved resources are allocated based upon a priority, wherein said allocating of unreserved resources to a particular flow, said flow having an input rate, said flow being one of said plurality of flows, based upon a priority, further comprises the steps of:

extrapolating from said input rate of said network link speed detecting step an extrapolated unreserved demand (EUD);

aggregating together a plurality of individual flow demands to form an aggregate rate demand (ARD);

combining said EUD and said ARD to form an instantaneous total demand;

allocating available bandwidth resources based upon instantaneous total demand determined in the combining step from highest priority demand first to lower priority demanded to yield a satisfaction percentage of demand;

determining a target rate for individual flows by multiplying said individual flow demand for each flow by said satisfaction percentage of demand determined in the allocating step.

3. The method of claim 2 wherein said unreserved resources comprise a plurality of individual inputs, each input having a priority, further comprising the step of:

determining a target rate for said inputs according to said priority by multiplying said extrapolated unreserved demand by said satisfaction percentage of demand determined in the allocating step.

4. A method for allocating bandwidth in a packet telecommunication system having any number of flows, including zero, using a classification paradigm comprising the steps of:

parsing a packet into a flow specification, wherein said flow specification contains one or more instances of any of the following:
a protocol family designation,
a direction of packet flow designation,
a protocol type designation,
a plurality of hosts,
a plurality of ports,
in http protocol packets, a pointer to a URL; thereupon, matching the flow specification of the parsing step to a plurality of hierarchically-recognized classes represented by a plurality of nodes, each node having a traffic specification and a mask, according to the mask; thereupon, having found a matching node in the matching step, associating said flow specification with one of said plurality of hierarchically-recognized classes represented by a plurality nodes;

allocating bandwidth resources according to a policy associated with said class; and determining that if guaranteed information rate resources are insufficient to accommodate said flow, invoking an admissions policy.

5. A method for allocating network bandwidth, which bandwidth comprises guaranteed information rate (GIR) resources, excess information rate (EIR) resources and unreserved rate resources, on Internet Protocol (IP) flows in a packet communication environment allocated into layers, including at least a transport layer, a link layer and an application layer, said method comprising:

automatically detecting selectable information about said flow;

determining a policy for assigning a service level to said flow based upon said automatically detected selectable information about said flow, said policy directing either reserved service or unreserved service;

dynamically allocating said bandwidth representing a combination of GIR resources and EIR resources based upon speed scaling and allocating unreserved resources based upon a priority among a plurality of flows assigned to said service level by said determining step;

wherein allocating said unreserved resources based upon a priority to a plurality of flows, each having an input rate, further comprises the steps of:

detecting input rate of a flow;

extrapolating from said input rate of the detecting step an extrapolated unreserved demand (EUD);

aggregating together a plurality of individual flow demands to form an aggregate rate demand (ARD);

combining said EUD and said ARD to form an instantaneous total demand;

allocating available bandwidth resources based upon the instantaneous total demand determined in the combining step from highest priority demand first to lower priority demanded to yield a satisfaction percentage of demand;

determining a target rate for individual flows by multiplying said individual flow demand for each flow by said satisfaction percentage of demand determined in the allocating step.

6. (Amended) The method of claim 5 wherein said unreserved resources comprise a plurality of individual inputs, each input having a priority, further comprising the step of:

determining a target rate for said inputs units according to said priority by multiplying said extrapolated unreserved demand by said satisfaction percentage of demand determined in the allocating step.

7. A method for allocating network bandwidth, which bandwidth comprises guaranteed information rate (GIR) resources, excess information rate (EIR) resources and unreserved rate resources, on Internet Protocol (IP) flows in a packet communication environment allocated into layers, including at least a transport layer, a link layer and an application layer, said method comprising:

automatically detecting selectable information about said flow;

determining a policy for assigning a service level to said flow based upon said automatically detected selectable information about said flow, said policy directing either reserved service or unreserved service;

dynamically allocating said bandwidth representing a combination of GIR resources and EIR resources and unreserved among a plurality of flows assigned to said service level by said determining step;

determining that if guaranteed bandwidth available is insufficient to accommodate said flow, invoking an admissions policy.

8. A method for allocating network bandwidth, which bandwidth comprises guaranteed information rate (GIR) resources, excess information rate (EIR) resources and unreserved rate resources, on Internet Protocol (IP) flows in a packet communication environment allocated into layers, including at least a transport layer, a link layer and an application layer, said method comprising:

automatically detecting selectable information about said flow;

determining a policy for assigning a service level to said flow based upon said automatically detected selectable information about said flow, said policy directing either reserved service or unreserved service, applying individual instances of traffic classes, each traffic class having an associated policy, to said flow based on selectable information; and dynamically allocating said bandwidth representing a combination of GIR resources and EIR resources and unreserved among a plurality of flows assigned to said service level by said determining step.

9. The method of claim 7 wherein said traffic classes have a hierarchical relationship to one another.

10. A method for allocating network bandwidth, which bandwidth comprises guaranteed information rate (GIR) resources, excess information rate (EIR) resources and unreserved rate resources, on Internet Protocol (IP) flows in a packet communication environment allocated into layers, including at least a transport layer, a link layer and an application layer, said method comprising:

automatically detecting selectable information about said flow;

determining a policy for assigning a service level to said flow based upon said automatically detected selectable information about said flow said policy directing either reserved service or unreserved service;

dynamically allocating said bandwidth representing a combination of GIR resources and EIR resources and unreserved among a plurality of flows assigned to said service level by said determining step; and allocating said bandwidth representing said unreserved data resources among flows based upon a priority associated with said flows.

11. A method for allocating network bandwidth, which bandwidth comprises guaranteed information rate (GIR) resources, excess information rate (EIR) resources and unreserved rate resources on Internet Protocol (IP) flows in a packet communication environment allocated into layers, including at least a transport layer, a link layer and an application layer, said method comprising:

automatically detecting selectable information about said flow;

determining a policy for assigning a service level to said flow based upon said automatically detected selectable information about said flow, said policy directing either reserved service or unreserved service;

dynamically allocating said bandwidth representing a combination of GIR resources and EIR resources and unreserved among a plurality of flows assigned to said service level by said determining step; and applying a partition to one or more classes, said partition having a limit on aggregate data rate flow.

12. The method of claim 11 wherein said limit is a soft partition limiting EIR for one or more classes.

13. The method of claim 4 wherein a node may have one or many traffic specifications.

14. The method of claim 4 wherein said plurality of hierarchically-recognized classes represents a plurality of orthogonal flow attributes.

15. The method of claim 4 wherein allocating bandwidth resources further comprises the steps of:

for rate based policies having a guaranteed information rate (GIR) and an excess information rate (EIR), allocating GIR until no further GIR is available; thereupon, allocating EIR, for priority based policies, having a priority, allocating unreserved service according to said priority.

16. The method according to claim 11, further including steps of stepwise mapping of policies according to association with nodes classified in a hierarchy.

17. The method according to claim 8 wherein said policy determining step comprises:

parsing a packet into a flow specification, wherein said flow specification containing one or more instances of any of the following:
a protocol family designation,
a direction of packet flow designation,
a protocol type designation,
a plurality of hosts,
a plurality of ports,
in http protocol packets, a pointer to a URL; thereupon, matching the flow specification of the parsing step to a plurality of hierarchically-recognized classes represented by a plurality of nodes, each node having a traffic specification and a mask, according to the mask.

* * * * *